(12) United States Patent
Shinoda et al.

(10) Patent No.: US 7,626,561 B2
(45) Date of Patent: Dec. 1, 2009

(54) SIGNAL CARRYING APPARATUS

(75) Inventors: Hiroyuki Shinoda, Kawasaki (JP); Hiroto Itai, Tokyo (JP); Naoya Asamura, Tokyo (JP)

(73) Assignee: Cell Cross Corporation, Tokyo (JP)

( * ) Notice: Subject to any disclaimer, the term of this patent is extended or adjusted under 35 U.S.C. 154(b) by 102 days.

(21) Appl. No.: 12/066,422

(22) PCT Filed: Sep. 12, 2005

(86) PCT No.: PCT/JP2005/016718

§ 371 (c)(1),
(2), (4) Date: Mar. 11, 2008

(87) PCT Pub. No.: WO2007/032049

PCT Pub. Date: Mar. 22, 2007

(65) Prior Publication Data

US 2009/0128256 A1    May 21, 2009

(51) Int. Cl.
*H01Q 1/36*    (2006.01)

(52) U.S. Cl. .................................. 343/897; 343/905

(58) Field of Classification Search ................ 343/897, 343/905
See application file for complete search history.

(56) References Cited

U.S. PATENT DOCUMENTS 3,059,322 A * 10/1962 Teague .......................... 29/600
3,165,817 A * 1/1965 Teague .......................... 29/600
7,486,252 B2 * 2/2009 Hiltmann et al. ............ 343/897

FOREIGN PATENT DOCUMENTS

| | | |
|---|---|---|
| JP | 2000278189 | 6/2000 |
| JP | 2003273785 | 9/2003 |
| JP | 2004007448 | 1/2004 |

* cited by examiner

*Primary Examiner*—Hoang V Nguyen
(74) *Attorney, Agent, or Firm*—Howard & Howard Attorneys PLLC

(57) ABSTRACT

A signal carrying apparatus (101) for transmitting a signal by variation of electromagnetic field comprises a meshed first conductor portion (111) which serves as a conductor in the frequency band of the electromagnetic field, and a second conductor portion (121) of which external shape is sheet-like and which serves as a conductor in the frequency band of the electromagnetic field and arranged substantially in parallel with the first conductor portion (111). In the interval region (131) between the external shape of the first conductor portion (111) and the external portion of the second conductor portion (121), and in the planar leak region (141) located oppositely to the interval region (131) across the external shape of the first conductor portion (111), the electromagnetic field propagating in that frequency band has a strength attenuating exponentially with the distance from the external shape of the first conductor portion (111) in the leak region (141).

16 Claims, 17 Drawing Sheets

FIG. 1
(a) Plan View
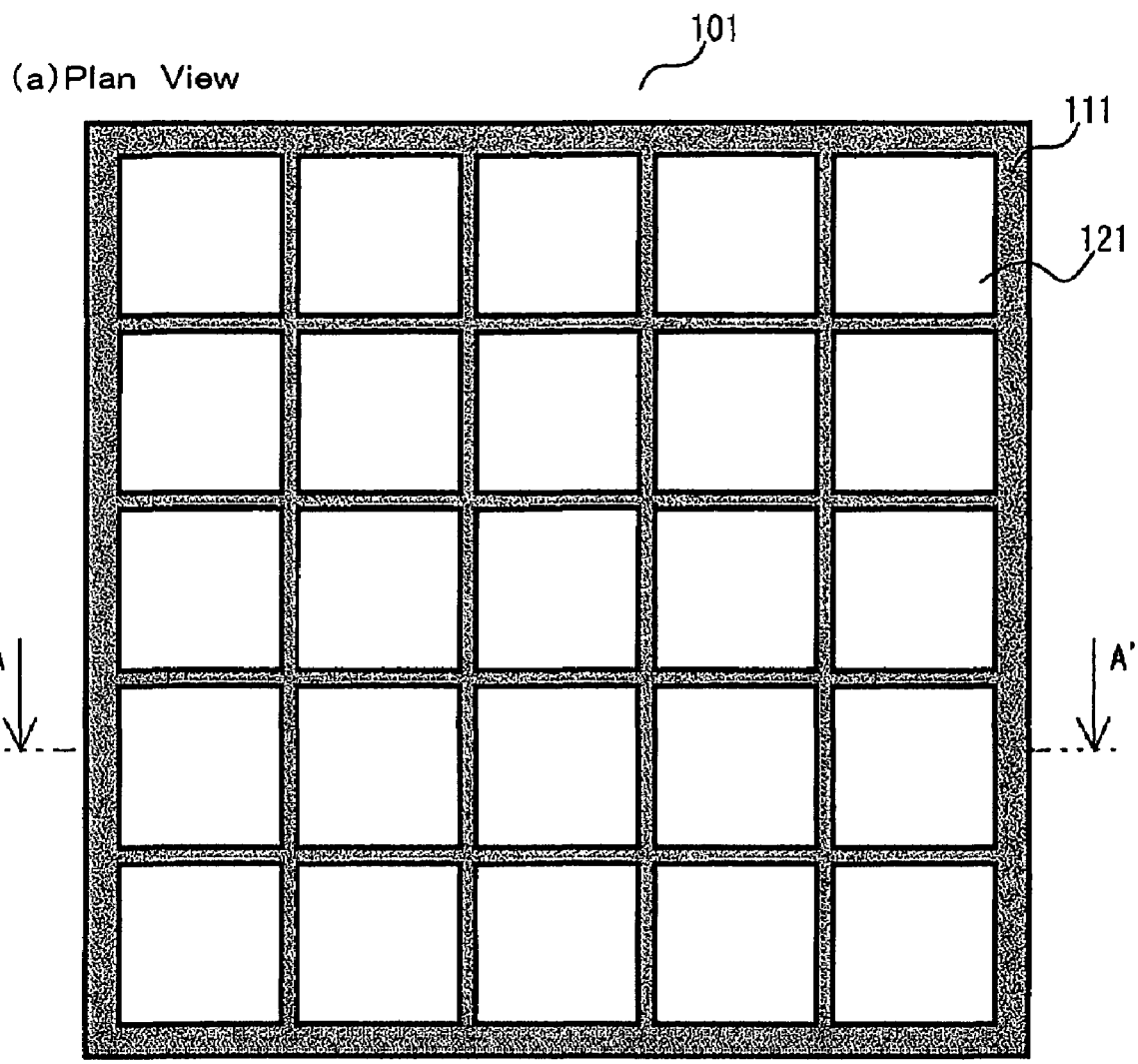
(b) A–A' Cross-Section
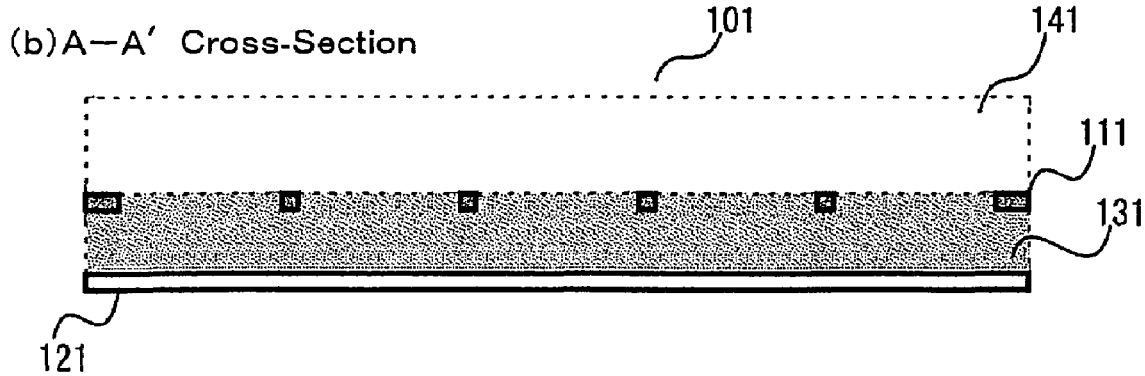

FIG. 13
Bottom-View
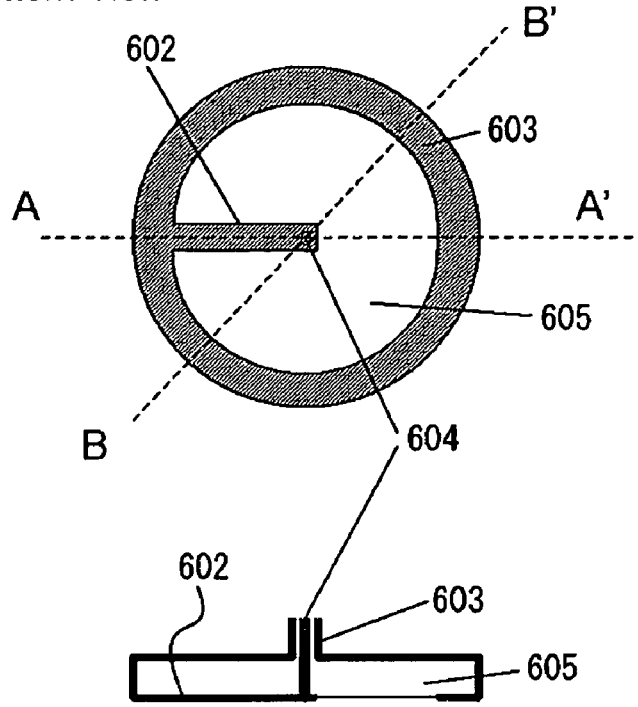
Cross-Section at A-A'
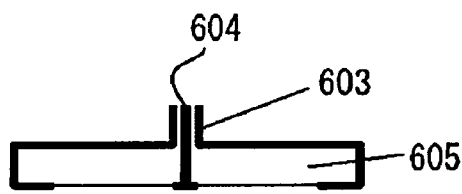
Cross-Section at B-B'
FIG. 14
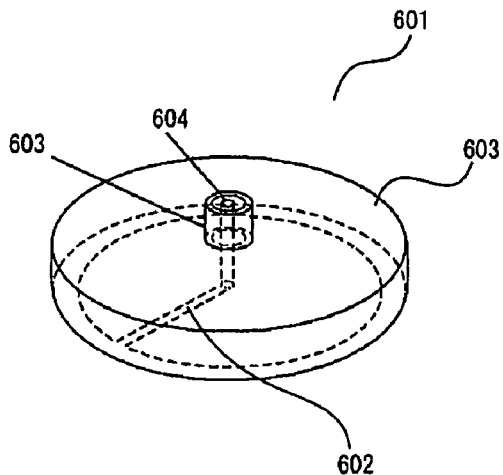

FIG. 15
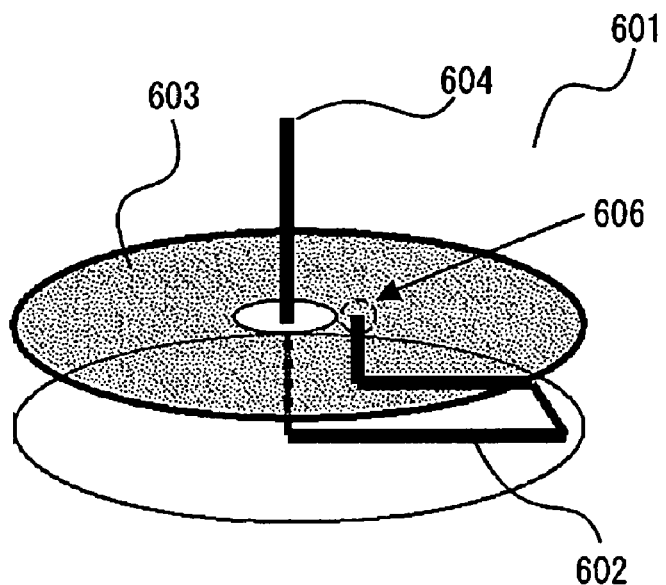
FIG. 16
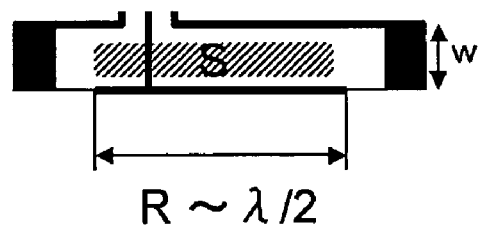
$R \sim \lambda/2$
Current |I| on Proximity Path
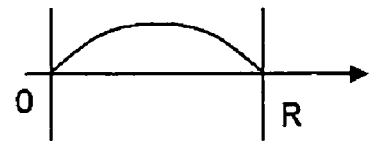
Magnetic Field |B| in Region S
Electric Field E in Region S
(Waveform at a moment where
E is the maximum at the left end.
A phase relationship with I depends
on the coupling of the outside.)

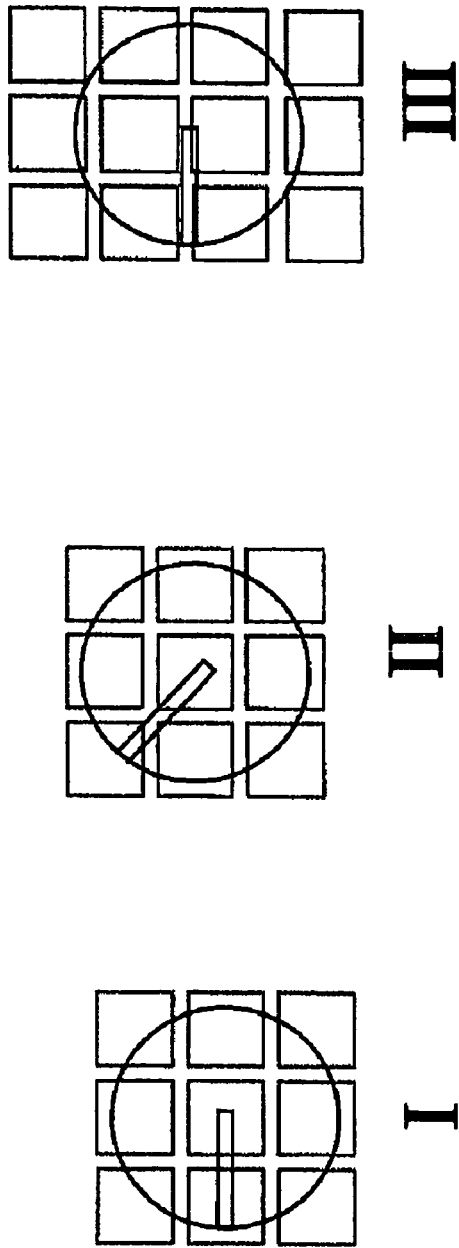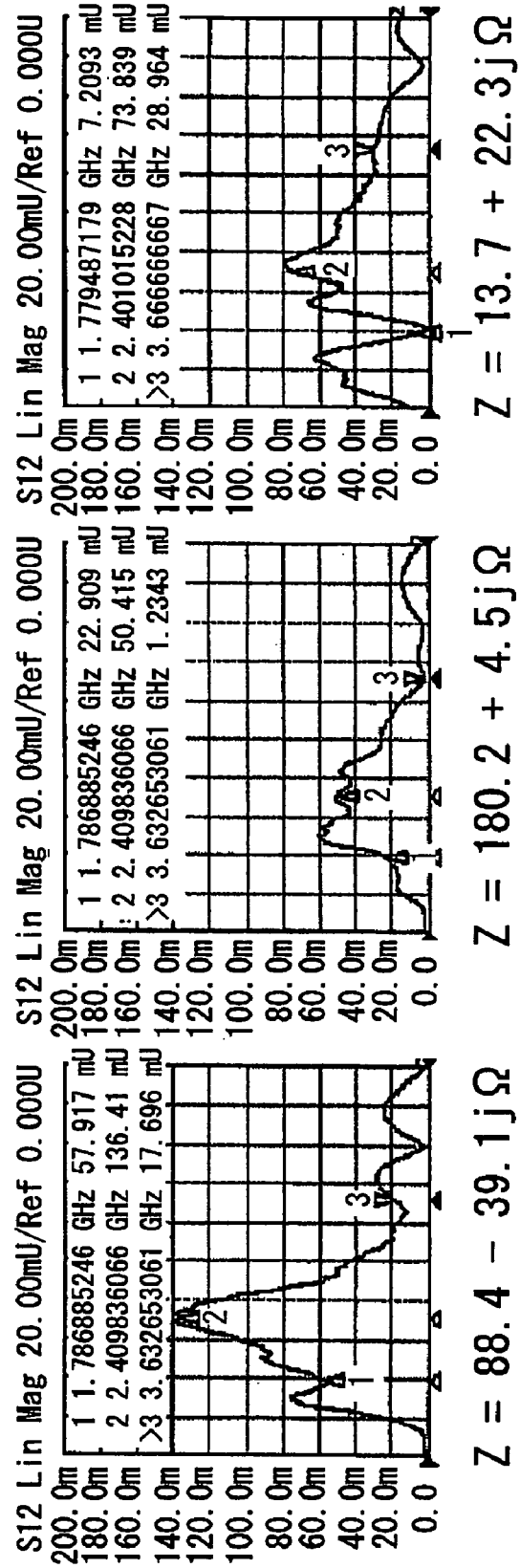
FIG. 20

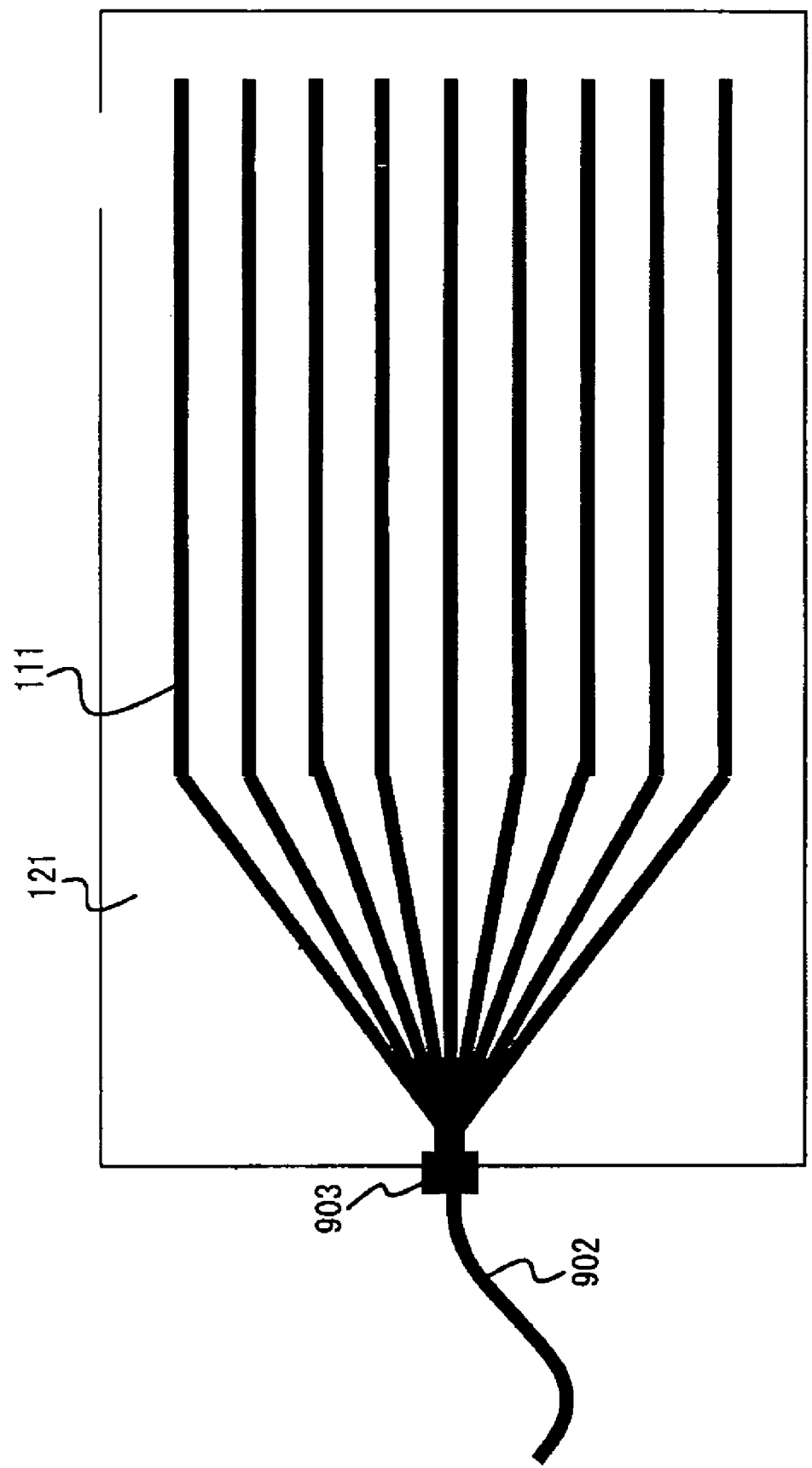

SIGNAL CARRYING APPARATUS

TECHNICAL FIELD

The present invention relates to a signal carrying apparatus for transmitting a signal by variation of electromagnetic field in the interval region between a meshed conductor portion and a sheet-like conductor portion and the leak region outside the meshed conductor portion side.

BACKGROUND ART

Inventors of the present application have been proposing technologies for a sheet-like (cloth-like, paper-like, foil-like, plate-like, film-like, or mesh-like, one dimensioned as a plane but having a thin thickness) communication device having a plurality of communication elements embedded therein. For example, the following literature discloses a communication device having a plurality of communication elements, embedded in a sheet-like member (hereinafter, a "sheet-like body"), relay a signal without individual wirings, thereby transmitting the signal.

Patent Literature 1: Japanese Unexamined Patent Application KOKAI Publication No. 2004-007448

According to the technology disclosed in the [patent literature 1], communication elements are disposed at respective vertexes of a figure formed in a grid-like shape, a triangular shape, or a honeycomb-like shape on the surface of the sheet-like body. A communication element utilizes a change in a potential, which is generated by the communication element and propagates strongly nearby but attenuates distantly, and communicates another communication element only.

By successively transmitting a signal between individual communication elements through local communications, the signal is transmitted to a target communication element. The plurality of communication elements are hierarchized by a management function, path data is set for each hierarchy, so that a signal is efficiently transmitted to a final-destination communication element.

On the other hand, developed through the researches of the inventors is a technology such that an electromagnetic field is generated at a region sandwiched between sheet-like bodies facing with each other, and the electromagnetic field is made progress by changing the electromagnetic field through a change in a voltage between the two sheet-like bodies, and by changing the voltage between the sheet-like bodies through a change in the electromagnetic field, thereby performing communication.

To detect a voltage between the two sheet-like bodies, in general, a communication device is directly connected to both sheet-like bodies via wires, and the sheet-like body is provided with a connector which is to be connected to the communication device.

DISCLOSURE OF INVENTION

Problem to be Solved by the Invention

However, if such wired connection is avoided as much as possible and the sheet-like body is made to be capable of transmitting a signal by moving an external communication device closer to the sheet-like body, it becomes user-friendly, and the maintenance efficiency becomes improved.

Then, a new technology for coping with such a request is strongly required.

The present invention responds to this request, and the purpose of the present invention is to provide a signal carrying apparatus for transmitting a signal by variation of electromagnetic field in the interval region between a meshed conductor portion and a sheet-like conductor portion and the planar leak region on the external side of the meshed conductor portion.

Means for Solving the Problem

In order to achieve the afore-mentioned object, the below-mentioned invention is disclosed in accordance with the principle of the present invention.

The signal carrying apparatus of the present invention carries a signal by variation of electromagnetic field and an interface device for transmitting the signal between the interface device and the signal carrying apparatus, and is configured as below.

Namely, the first conductor portion serves as a conductor in the frequency of the electromagnetic field and is of a meshed shape.

On the other hand, the second conductor portion is disposed in substantially parallel with the first conductor portion, serves as a conductor in the frequency band of the electromagnetic field, and the external shape is sheet-like.

Further, the electromagnetic field is transmitted in the frequency band in the interval region sandwiched between the external shape of the first conductor portion and that of the second conductor portion and the leak region of the planar external shape positioned oppositely which sandwiches the external shape of the first conductor portion with the interval region.

Then, of the electromagnetic field in the leak region, the strength of the traveling wave component that is affected by the meshed shape is exponentially attenuated with the distance from the external shape of the first conductor portion.

In addition, in the signal carrying apparatus of the present invention, the repeated unit length of the meshed shape is d and the thickness of the leak region can be constituted to be d even if it is the maximum value.

In addition, in the signal carrying apparatus of the present invention, the average width of the mesh size in the meshed shape is d and can be constituted to be d even if it is the maximum value.

In addition, in the signal carrying apparatus of the present invention, the meshed shape is a mesh one that repeats polygons of the same shape, the repeated unit length is d, of the electromagnetic field in the leak region, the strength of the traveling wave component that is affected by the meshed shape can be so configured as to be attenuated with coefficient of $e^{-2\pi z/d}$ or less relative to the distance z to the leak region from the external shape of the first conductor portion.

In addition, in the signal carrying apparatus of the present invention, the shape of the meshed portion is a mesh one such that a plurality of circular holes are provided in a flat plate, the central distances of the circular holes are each d, of the electromagnetic field in the leak region, the strength of the traveling wave component that is affected by the meshed shape can be so configured as to be attenuated with coefficient of $e^{-2\pi z/d}$ or less relative to the distance z to the leak region from the external shape of the first conductor portion.

In addition, it can be configured such that in the signal carrying apparatus of the present invention, the variation of the electromagnetic field is transmitted to the antenna disposed in the leak region from the interval region and leak region, or the variation of the electromagnetic field is transmitted to the interval region and leak region from the antenna, thereby communicating with an external device connected to the antenna.

Particularly, as external devices, a chip of RFID tag or various kinds of sensors can be also adopted.

In addition, it can be configured such that in the signal carrying apparatus of the present invention, the voltage between the first conduction portion and the second conduction portion varying with the electromagnetic field in the interval region and the leak region is transmitted to a communication device connected to the first conduction portion and the second conduction portion in wired connection, or signals are transmitted between the communication device and the external device by varying the voltage between the first conduction portion and the second conduction portion to vary the electromagnetic field in the interval region and the leak region.

In addition, in the signal carrying apparatus of the present invention, it can be configured such that the second conductor portion is a meshed shape, and the electromagnetic field is further transmitted in the frequency band in the planar shaped opposite region oppositely positioned that sandwiches the external shape of the second conductor portion with the interval region.

In addition, in the signal carrying apparatus of the present invention, it can be configured such that the first conduction portion is a striped shape in place of the first conduction portion being a meshed one.

EFFECT OF THE INVENTION

The present invention can provide the signal carrying apparatus that transmits a signal by variation of electromagnetic field in the interval region between the meshed conduction portion and the sheet-like conduction portion and the leak region outside the meshed conduction portion.

BRIEF DESCRIPTION OF DRAWINGS

FIG. 1 is an explanatory diagram showing a schematic configuration of a signal carrying apparatus used in combination with an interface device of an embodiment according to the present invention;

FIG. 13 is an explanatory diagram showing a schematic configuration of a circular interface device;

FIG. 14 is an explanatory diagram showing a schematic configuration of the circular interface device;

FIG. 15 is an explanatory diagram showing the other embodiments of the interface device;

FIG. 16 is an explanatory diagram showing the relationship of the parameters and the conditions of current and magnetic field;

FIG. 20 is a graph showing the other receiving power in case the direction to one mesh of two interface devices is varied;

FIG. 25 is an explanatory diagram showing an embodiment of the signal carrying apparatus with the first striped conduction portion in place of a meshed one.

EXPLANATION OF REFERENCE NUMERALS

Figure 2:
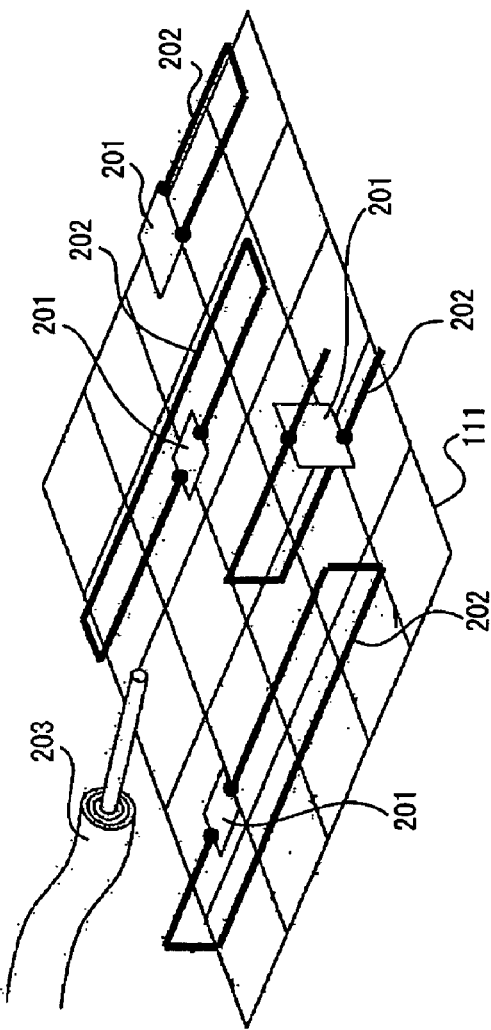
FIG. 2 is an explanatory diagram showing the condition of the interface device of the simplest shape to the signal carrying apparatus of the embodiment.

101 Signal Transmitter
111 First Conductor Portion
121 Second Conductor Portion
131 Interval Region
141 Leak Region
151 Opposite Region
201 Communication Circuit
202 Loop Antenna
203 Dipole Antenna
601 Interface Device
602 Internal Conductor Portion
603 External Conductor Portion
604 Path Conductor Portion
605 Insulator Portion
606 Connection Point
901 Conductor Plate
902 Coaxial Cable
903 Junction Portion
904 Striped Conduction Portion

BEST MODE FOR CARRYING OUT THE INVENTION

The embodiment of the present invention is described below. In addition, the description of the embodiment is for explanation purpose only, and does not limit the scope of the present invention. Therefore, those who are skilful in the art can adopt embodiments where each factor or all the factors thereof are replaced with new ones which are equal to those in the present invention. However, these embodiments are also included in the scope of the present invention.

The planar shaped signal carrying apparatus and the interface device for acquiring and carrying signals by allowing the interface device to be put closer to the signal carrying apparatus are sequentially described below.

In addition, for easier understanding, a conductor which is in a frequency band of electromagnet field used for a signal transmission is hereinafter referred to as "a conductor" and a dielectric which is in the frequency band is hereinafter referred to as "a dielectric". Therefore, for example, a matter which is an insulator to direct current may be also referred to as "a conductor".

Embodiment 1

(Signal Transmitter)

FIG. 1 is an explanatory diagram showing a schematic configuration of the signal carrying apparatus of the embodiment and is described with reference to the diagram below.

The diagram (b) is a cross-section of the signal carrying apparatus 101 of the embodiment. As shown in the diagram, the signal carrying apparatus 101 is provided with the meshed first conductor portion 111 and the planar second conductor portion 121 substantially in parallel therewith.

Here, a region between the first conductor portion 111 and the second conductor portion 121 is the interval region 131, and a region on the first conductor portion 111 in the diagram is the leak region 141.

The diagram (a) is a plan view of the signal carrying apparatus 101. The first conductor portion 111 of the embodiment is of a mesh of squares, and the second conductor portion 121 is shown through in the square.

In addition, the repeated unit is equal to the centers of the squares that are horizontally adjacent to each other and these are almost equal to the length of one side of the square.

In the embodiment, the interval region 131 and the leak region 141 are each of the air. However, any or both of them may be of various kinds of dielectrics, water, soil, or vacuum.

The external shapes of the first conductor portion 111 and the second conductor portion 121 are each sheet-like materials (cloth-like, paper-like, foil-like, planar, membranous, film-like, and the like, which are each broad as a surface and the thicknesses are each small).

Therefore, for example, if the wall of a chamber should be the signal carrying apparatus of the embodiment, a sheet of metal foil is first affixed as the second conductor portion 121, an insulator is then sprayed, a metallic mesh is affixed as the first conductor portion 111, and a wall paper of insulator may be further affixed.

Then, an attention should be thus paid to an electromagnetic wave mode propagating in the interval region 131 between the first conductor portion 111 and the second conductor portion 121 in the signal carrying apparatus 101.

Supposing that the first conductor portion 111 is not of mesh, and is of a structure without a foil-like aperture, the electromagnetic wave is completely contained in the interval region 131.

However, the first conductor portion 111 has a meshed structure with an aperture. In such a shape, the electromagnetic wave is liable to leak by a height almost equal to the distance of the mesh. A region in which the electromagnetic wave leaks is the leak region 141.

The height (thickness) of the leak region 141 is almost the same as in the repeated unit of the mesh. Actually, the strength of the electromagnetic wave is liable to exponentially attenuate corresponding to a distance of the surface of the first conductor portion 111.

FIG. 2 is an explanatory diagram showing the condition of the interface device of the simplest shape to the signal carrying apparatus of the embodiment. In the diagram, there is shown the condition that communications are performed between the interface device and the signal carrying apparatus 101 by arranging a loop antenna or a dipolar antenna as the interface device. It is described with reference to the diagram below.

The diagram shows four combinations of the communication circuit 201 that performs transmitting/receiving and the loop antenna 202 connected to the communication circuit in the leak region 141 present on the surface of the meshed first conductor region 111.

It is preferable that the length of the loop antenna 202 is almost half of the length of the electromagnetic wave transmitted by the signal carrying apparatus 101. However, even if it is larger or smaller than this one, communications are possible.

The diagram shows a case that an antenna is vertically disposed on the surface of the first conductor portion 111 if the longitudinal loop antenna 202 is disposed in parallel with the surface of the first conductor portion 111.

In addition, the diagram shows a case that both ends of the horizontally set U-shaped loop antenna 202 are terminated by the communication circuit 201 and is disposed in parallel with the surface of the first conductor portion 111.

Furthermore, the diagram shows a case that a shaped one such that the horizontally set U-shaped loop antenna 202 is connected to the communication circuit 201 and its end is further extended up to the opposite side of the communication circuit 201 is vertically disposed on the surface of the first conductor portion 111.

In addition to the afore-mentioned, the interface device using the dipolar antenna 203 where the core wire of a coaxial cable is merely exposed is also illustrated. In this case, it is possible to receive the electromagnetic wave between the communication device and the signal carrying apparatus 101 connected to the coaxial cable by putting the core wire of the dipolar antenna 203 closer to the first conductor portion 111.

It is possible to perform communications between these communication circuits 201, or to perform communications between the communication device and the communication circuit 101 connected to the coaxial cable through the signal carrying apparatus 201. In addition, even if it is not shown in the diagram, it is also possible to communicate with a communication device if the communication device directly connected in wired connection to the first conductor portion 111 and the second conductor portion 121 is provided. Thus, any of 1 versus 1, 1 versus N, N versus 1, N versus N is also possible.

Further, the device can be used as a read-out device of a tag using a circuit of RFID tag as the communication circuit 201, further a sensor can be mounted thereon. In addition, there provides also a form of usage that it is connected to an external device by wiring from the communication circuit, and it is connected to a coaxial cable to connect it to the external device in place of being connected to the communication circuit.

In addition, it is also possible to charge the interface device side with a micro wave to supply an electric power.

Figure 3:
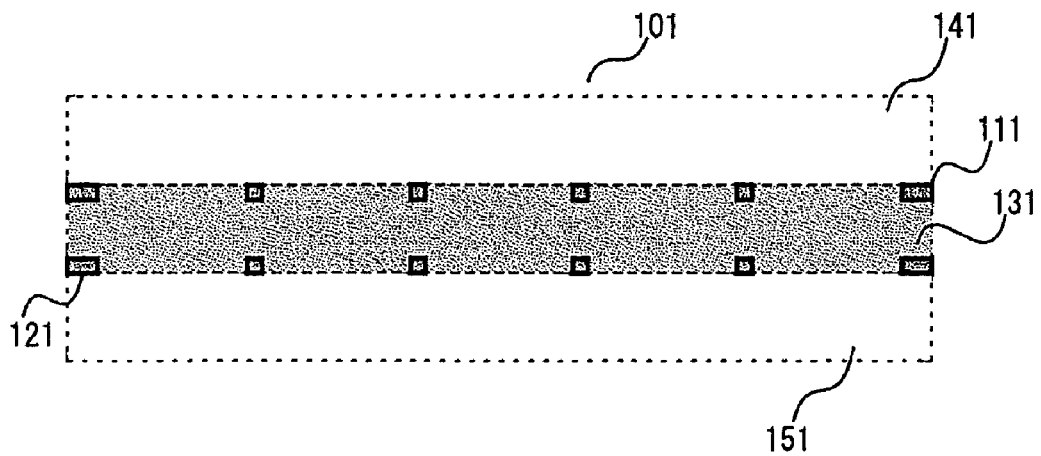
FIG. 3 is an explanatory diagram showing a schematic configuration of the signal carrying apparatus used in combination with the interface device of the embodiment according to the present invention.

In addition, the second conductor portion 121 is determined to be a foil-like conductor without any aperture. However, the second conductor 121 may be of a mesh as in the first conductor portion 111. FIG. 3 is a cross-section related to such a configuration.

As shown in the diagram, the opposite region 151 equivalent to the leak region 141 is present also outside the second conductor portion 121 and the electromagnetic wave is liable to leak also here. Therefore, the electromagnetic wave leaks on both of the front surface and backside, it is possible to receive signals if the interface device is put closer to any of the surfaces.

Then, such a theoretical background of the leak region 141 is briefly described below. In the signal carrying apparatus 101 in such a configuration as afore-mentioned, the mode $\phi_n$ of the electromagnetic wave propagating without "radiating" the electromagnetic wave outside the signal carrying apparatus 101 is existent in the interval region 131 (the leak region 141 and opposite region 151 that are in the vicinity thereof).

Here, the height L of a near-field where the electromagnetic field of almost the same strength as in the interval region 131 leaks and there is no electromagnetic radiation to a distance is L=about $d/(2\pi)$ when the repeated unit length of mesh is assumed as d.

Here, the amplitude of the electromagnetic wave that leaks attenuates almost as in $e^{-z/L}$ if a distance from the surface of the first conductor portion 111 or the second conductor portion 121 is assumed as z in the leak region 141 or the opposite region 151.

Therefore, the interface device is disposed in the scope of the distance L from the first conductor portion 111 (or the second conductor portion 121) and $\phi_n$ is induced to transmit a signal. In addition, the scope may be about the length d in place of the distance L depending upon the sensitivity of the interface device. Namely, it can be considered that the thickness of the leak region 141 (or the opposite region 151) is about L to d.

Figure 4:
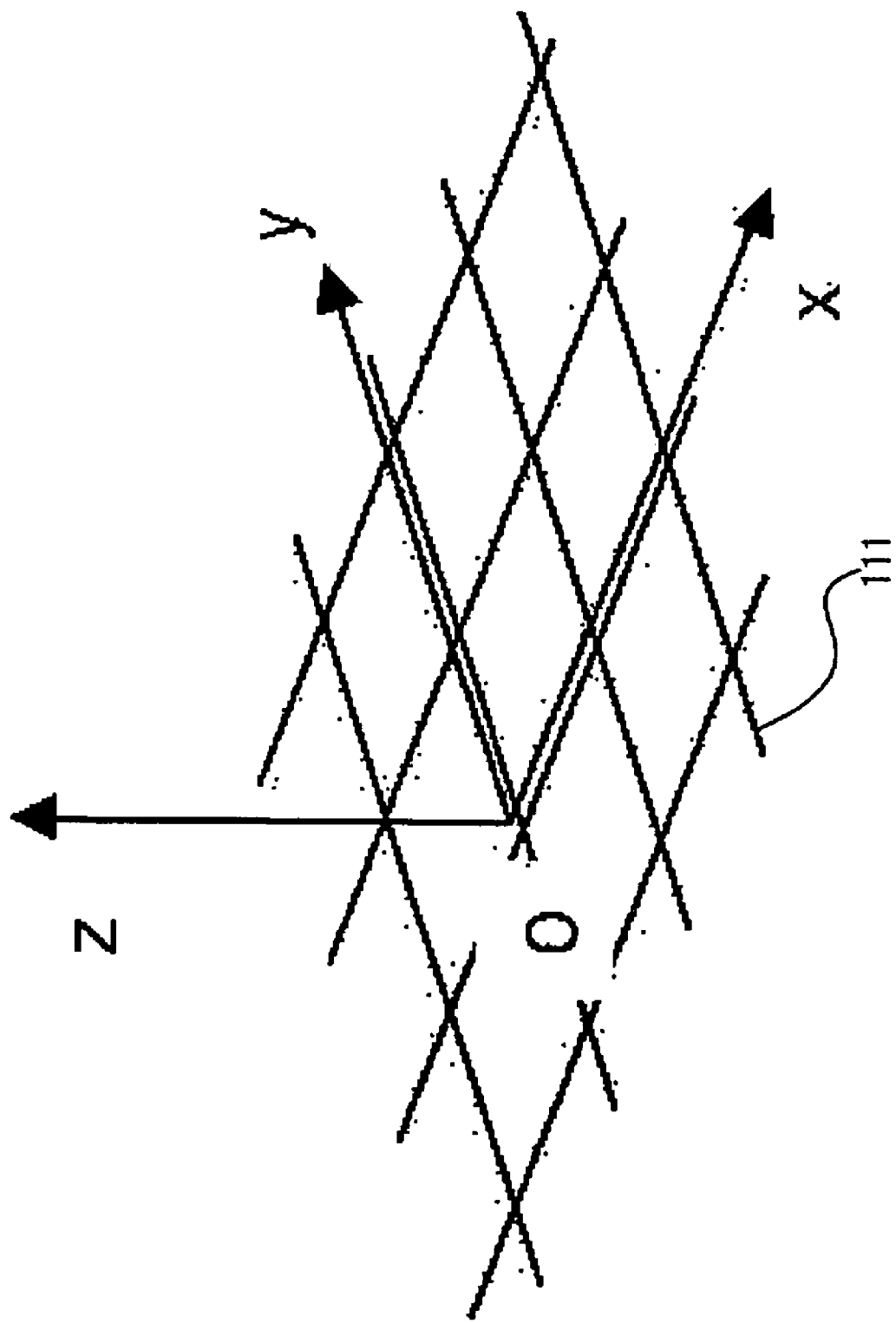
FIG. 4 is an explanatory diagram showing the condition of the coordinate system used to analyze the signal carrying apparatus.

It is further considered in detail below. FIG. 4 is an explanatory diagram showing the condition of the coordinate system used to analyze the signal carrying apparatus 101. It is described with reference to the diagram below.

As shown in the diagram, it is assumed that the meshed first conductor portion 111 where the repeated unit length is d is disposed at z=0 and the second conductor portion 121 is disposed at z=−D. Then, it is assumed that other than the first conductor portion 111 and the second conductor portion 121 are filled with dielectrics of dielectric constant ∈. It is assumed that a mesh is a mesh of squares. The original point is superposed on the mesh intersection, and the x axis and the y axis are in parallel with the mesh.

Then, electromagnetic energy is locally present in the vicinity of the meshes, the traveling wave solution in the form of $E_z=Af(x, y, z)\exp(-j(xk_x+yk_y))$ relative to the electric field E out of the electromagnetic field. Here, $E_z$ is the z component of the electric field, A, $k_x$, and $k_y$ are each constant, and f(x, y, z) is a function having a cycle d in the x direction and the y direction, $k=(k_x, k_y, 0)$ is a wave vector (propagation vector) showing the traveling direction of the traveling wave.

Namely, f(x+d, y, z)=f(x, y, z)=f(x, y+d, z) is established relative to arbitrary x, y, z.

Then, the electromagnetic field including $E_z$ meets the wave equation:

$\Delta E_z=-(\omega^2/c^2)E_z$ in the dielectric and $k_x^2+k_y^2\approx$(nearly equal)$\omega^2/c^2$.

Here, if an attention is paid to the electromagnetic field at z>0, the following Fourier expansion of f is possible with the cyclicality of f:

$f(x,y,z)=\Sigma_{m,n}a(m,n)\exp(2\pi j\, m\, x/d)\exp(2\pi jny/d)g(m,n,z)$ wherein, m and n are integers.

If d is sufficiently smaller than the wavelength of the electromagnetic wave λ, $2\pi/d$ is sufficiently larger than ω/c, the component:

$u(m,n)=\exp(2\pi j\, m\, x/d)\exp(2\pi j\, n\, y/d)g(m,n,z)$ approximately meets $\Delta u=(-(2\pi m/d)^2-(2\pi n/d)^2+\partial^2/\partial z^2)$
u=0, that is, $\partial^2/\partial z^2 g\approx(2\pi)^2(m^2+n^2)/d^2 g$ from the independency of each component of Fourier expansion in the case of (m,n)≠(0,0). Therefore, it is $g(m,n,z)\approx B\exp(-2\pi(m^2+n^2)^{1/2}z/d)$.

wherein, B is a constant. Therefore, of the component of (m,n)≠(0,0), its attenuation coefficient is $d/(2\pi)$ or less.

Here, the component of (m,n)#(0,0) is equivalent to the component of the traveling wave where the cycle of the meshed structure is modulated.

In addition, the component equivalent to (m,n)#(0,0), namely, the component of the traveling wave where the cycle of the meshed structure is not modulated reaches up to about the wavelength $\lambda=2\pi/(k_x^2+k_y^2)^{1/2}$. However, its strength is small. This component is a component that is directly related to the item $\exp(-j(xk_x+yk_y))$.

The vertical electric field $E_2$[V/m] generated when the first conductor portion 111 is determined to be a mesh-shaped conductor with square mesh network of d=2 [mm], the second conductor portion 121 is determined to be a foil-like conductor, and mean line charge density σ=1[C/m] is given to the first conductor portion 111 in accordance with such as a theoretical background is multiplied by coefficient 4π∈, thereby finding the product.

As in the afore-mentioned, the first conductor portion 111 is disposed at z=0 and the second conductor portion 121 is disposed at z=−D. The original point is superposed upon the mesh intersection, and the x axis and the y axis are in parallel with the meshes.

Figure 5:
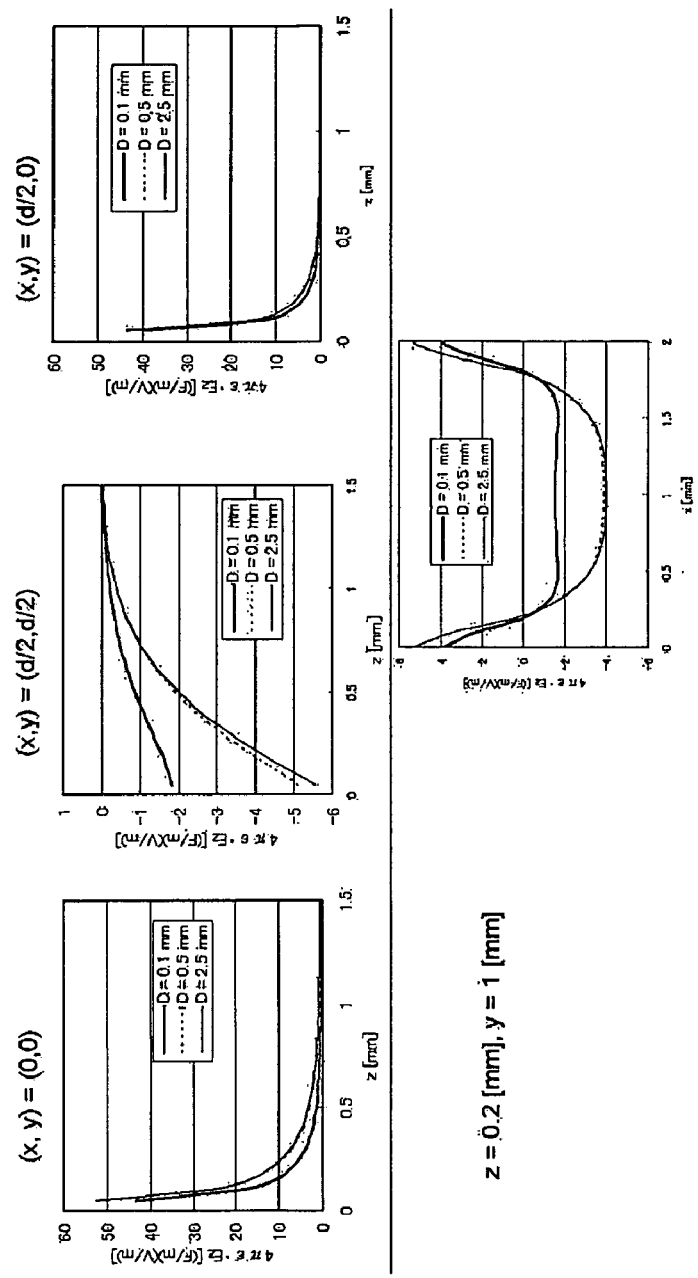
FIG. 5 is an explanatory diagram showing the strength of a vertical electric field at various places in the signal carrying apparatus.

FIG. 5 is an explanatory diagram showing the strengths of the vertical electrical fields at various places in the signal carrying apparatus in this case. It is described with reference to the diagram below.

As shown in three graphs in the upper row of the diagrams, it is understood that the vertical electrical field becomes almost 0 from the vicinity of z=1[mm] in any of (x,y)=(0,0), (x,y)=(d/2,d/2), (x,y)=(d/2,0). In addition, the vertical electrical fields at y=1 [mm] and z=0.2 [mm] each become a cyclic pattern as shown in one graph in the lower row of the diagram.

Thus, because it is considered that the leak of the electromagnetic field is about 1 mm when the repeated unit length of the mesh is 2 mm, it is considered that induction between the mesh and the electromagnetic field becomes possible to transmit and receive signals if the interface device is put closer to the meshes in the distance or less.

In addition, the electrical field distribution in the case where the mesh structure of the second conductor portion 121 disposed at z=−D is the same as in the first conductor portion 111 disposed at z=0 is the same distribution as in the case where the foil-like second conductor portion 121 is disposed at z=−D/2 and the meshed first conductor portion 111 is disposed at z=0, in accordance with the principle of symmetry. Therefore, a similar conclusion as the afore-mentioned is obtained.

Thus, about d/(2π) to d/2 to d order is considered sufficient as the thickness of the interval region 141 or the opposite region 151, and communications can be performed by "dipping" an interface into the leak region 141 or the opposite region 151.

In addition, the component corresponding to (m, n)=(0,0) may leak up to about the electromagnetic wavelength $\lambda=2\pi/(k_x^2+k_y^2)^{1/2}$ in a communication layer. However, because the strength of the component is weaker than those of others in the vicinity of the surface in the communication layer, the strength thereof can be ignored.

In addition, the mesh needn't to be inevitably the repetition of squares, and may be of various polygonal shapes. In addition, the unit of the mesh needn't to be inevitably limited to the same shape, if it is of appropriately formed meshes, and it may be of a different shape. In this case, it is considered that a value equivalent to the afore-mentioned d is an average one of each mesh. In addition, if these basic cycles are present, it can be also considered that the cycle is d.

Besides the afore-mentioned, a portion where a plurality of punched circular holes are arranged in a honeycomb form in a planar conductor may be used as the first conductor portion 111. In this case, the distances of the centers of circles are equivalent to the afore-mentioned d.

(Interface Device)

In the afore-mentioned descriptions, the loop antenna 202 or the dipolar antenna 203 is used in the interface device. However, an interface device such that electromagnetic field having directivity can be radiated is proposed below.

In addition, it is preferable that the interface device proposed here is used in a combination with the afore-mentioned signal carrying apparatus 101. However, if it can contact the electromagnetic field that transmits the signal, communications are possible. Therefore, aspects that the interface device is used are not limited to a combination with the afore-mentioned signal carrying apparatus 101.

Figure 6:
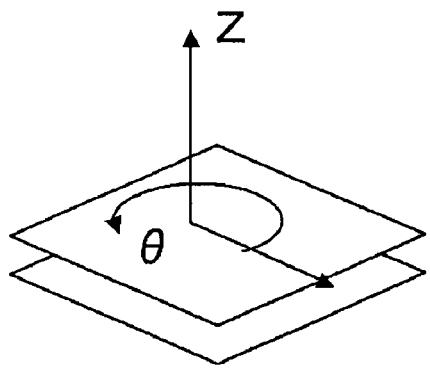
FIG. 6 is an explanatory diagram showing the directivity of an electromagnetic field.

FIG. 6 is an explanatory diagram for explaining the directivity of such an electromagnetic field. It is described with reference to the diagram.

As shown in the diagram, if it is assumed that an angle around the z axis vertically set to the first conductor portion 111 and the second conductor portion 121 in the signal carrying apparatus 101 is θ, the electromagnetic field $\phi_1$ radiated by the interface device of the embodiment is as follows:

$$E_z \approx e(r,z)\cos\theta;$$

$$B_\theta \approx b(r,z)\cos\theta;$$

wherein, $r^2=(x^2+y^2)$ if it is assumed that the electromagnetic field in the z direction is $E_z$ and the magnetic field component in the counterclockwise direction of the z axis is $B_\theta$.

Figure 7:
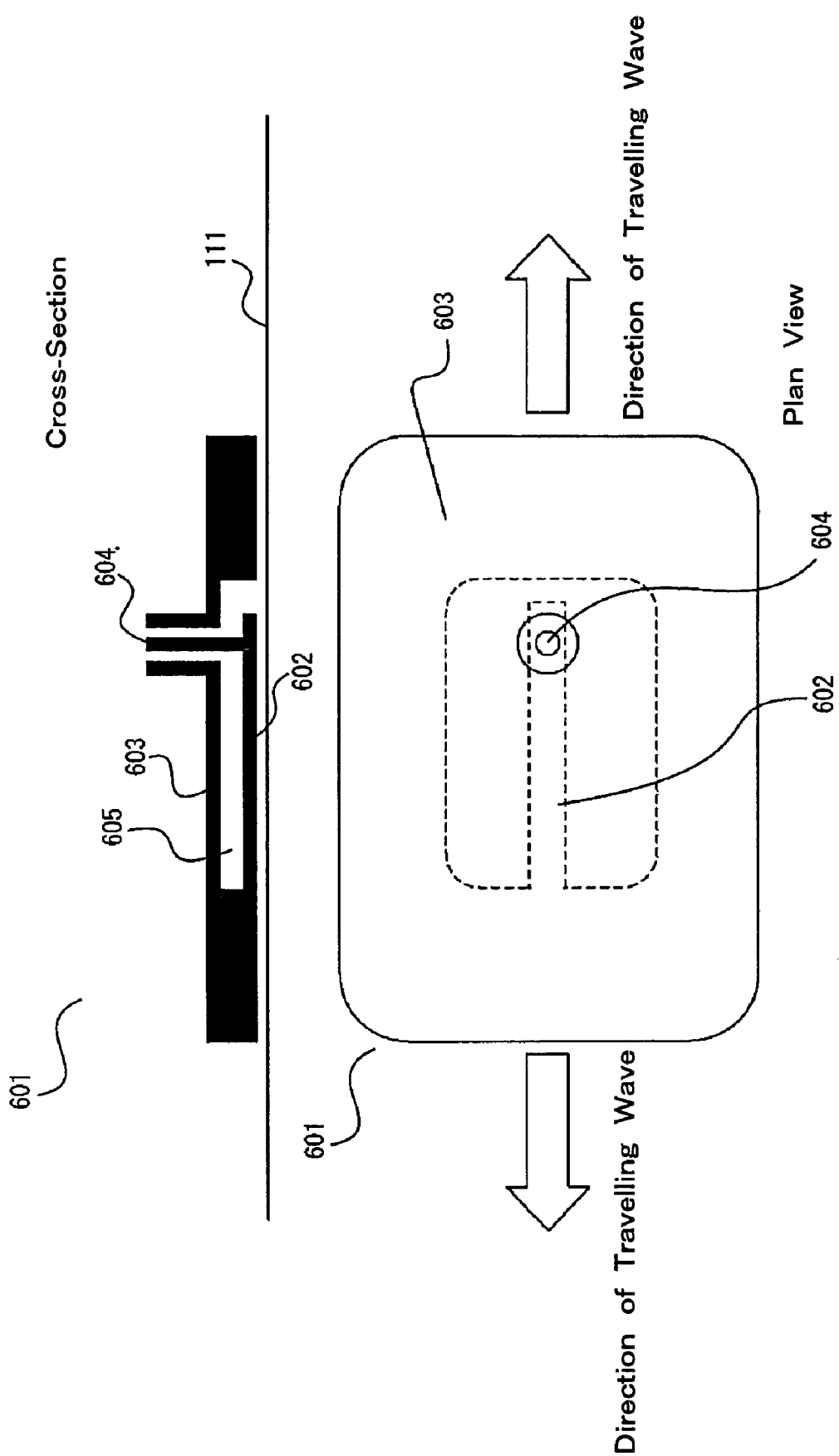
FIG. 7 is an explanatory diagram showing a schematic configuration of one embodiment of the interface device having directivity.

FIG. 7 is an explanatory diagram showing a schematic configuration of one embodiment of the interface device having such directivity. It is described with reference to the diagram below.

The interface device 601 can be mostly divided into the internal conductor portion 602, the external conductor portion 603, and the path conductor portion 604.

The internal conductor portion 602 is a conductor that is being put closer to the signal carrying apparatus 101, is of a strip-like shape of width t, and one end thereof is connected to the external conductor portion 603 and the other end is connected to the path conductor portion 604, respectively.

The external conductor portion 603 is of a box-like structure that covers the internal conductor portion 602. An aperture is provided in the external conductor portion 603 and the path conductor portion 604 passes through the aperture non-contactly.

This allows a current path of the external conductor portion 603 to the internal conductor portion 602 to the path conductor portion 604 to be established. Then, if the coaxial cable or the signal transmitting/receiving circuit is connected to the external conductor portion 603 and the path conductor portion 604 in the vicinity of the aperture of the external conductor portion 603 to vary the current flowing here, the electromagnetic wave is mainly radiated in the directions of the arrows in the diagram.

Thus, electromagnetic energy can be efficiently received between the interface device and the signal carrying apparatus 101, because a useless electromagnetic radiation outside the interface device 601 can be prevented by covering the internal conductor portion 602 and the path conductor portion 604 with the external conductor portion 603.

In addition, portions other than the external conductor portion 603, the internal conductor portion 602, and the path conductor portion 604 may be filled with dielectric. In addition, of the external conductor portion 603, the internal conductor portion 602, and the path conductor portion 604, each surface whose outer surface thick portion only should be a conductor and each of their internal materials may be arbitrary ones.

It is desirable that the mutually opposed surfaces of the external conductor portion 603 and the internal conductor portion 602 are in parallel and the internal conductor portion 602 is also of a planar strip. Steps and irregularities may be allowable.

It is desirable that t is not extremely larger than w if a distance between the mutually opposed surfaces of the external conductor portion 603 and the internal conductor portion 602 is assumed as w. Namely, it is desirable that t is almost the same as w or is w or less.

Figure 8:
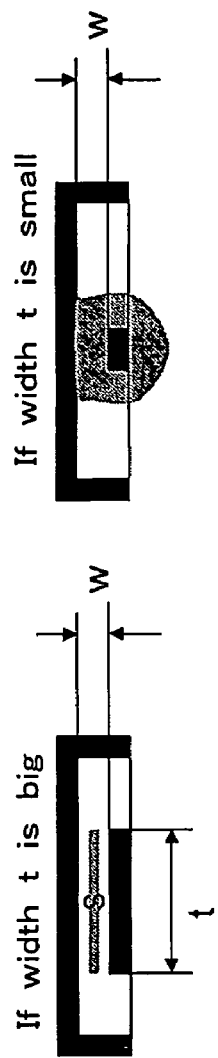
FIG. 8 is an explanatory diagram showing a relationship between t values and w values in the interface device.

FIG. 8 is an explanatory diagram showing a relationship between t and w in the interface device 601. It is described with reference to the diagram.

If t is almost the same as w or is w or less, the electromagnetic field generated by allowing the current to flow in the internal conductor portion 602 is also generated outside the interface device 601 (the hatched region on the right in the diagram), and the electromagnetic field is coupled with the traveling wave mode of the signal carrying apparatus 101, thereby enabling the system to induce the traveling wave.

On the other hand, if t becomes larger to cover the entire bottom of the interface device 601, transmitting/receiving signals can not be completely performed.

However, if a clearance is opened at a part of the bottom, a coupling with the traveling wave mode of the interval region 131 in the signal carrying apparatus 101 occurs. Then, there is also considered a case that t is more enlarged than w to decrease the impedance when the inside of the interface device 601 is viewed from the aperture of the external conductor portion 603 (which is a junction of the cable and the interface device 601), if impedance alignment is arranged with the cable and the communication circuit that drive the interface device 601.

However, in this case, the percentage of the energy accumulated in the hatched region S on the left hand in the diagram to the electromagnetic energy generated outside the interface device 601 becomes big, thus extra energy loss would occur due to the dielectric loss in the first conductor portion 111 contacting the region S and the region S.

Figure 9:
FIG. 9 is an explanatory diagram showing a general shape of the side of an internal conductor portion connected to a path conductor portion.

Therefore, a method wherein t per se is not enlarged, and wherein impedance alignment is performed can be adopted so as to allow the internal conductor portion 602 to include a plurality of thin bands. FIG. 9 is an explanatory diagram showing a general shape of the side to be connected to the path conductor portion 604 in the internal conductor portion 602 in such a case.

As shown in the diagram, the internal conductor portion 602 is of a fork-like shape and, it is configured such that a plurality of thin bands are extended from the path conductor portion 604 and are connected to the external conductor portion 603 (not illustrated in the diagram).

In addition, it is desirable that $2\pi R$ is not extremely smaller than X relative to the length R of the internal conductor portion 602 (the distance between the point where the internal conductor portion 602 is connected to the external conductor portion 603 and the point where the internal conductor portion 602 is connected to the path conductor portion 604 is R-m) and the wavelength $\lambda$ of the electromagnetic field.

Here, $\lambda$ is the wavelength $2\pi/(K_z^2+k_y^2)^{1/2}$ of the traveling wave in the signal carrying apparatus 101.

Supposing that $2\pi R \ll \lambda$ is established, this is because the percentage of energy loss (caused by the dielectric loss in the surroundings of the interface device and the resistance of metals) when the electromagnetic wave is transmitted to the signal carrying apparatus 101 becomes large, since the percentage of energy that is radiated in a distance significantly becomes small to the electromagnetic energy locally generated in the vicinity of the current path.

By the way, the interface device 601 in such a general shape can be connected to the afore-mentioned signal carrying apparatus 101 and can be also connected to a signal carrying apparatus where two sheet-like conductors are opposed and apertures are locally provided and a signal carrying apparatus where a sheet-like dielectric is affixed onto one sheet of sheet-like dielectric. Therefore, the interface device 601 can be applied to various signal carrying apparatuss.

The electromagnetic field generated by the interface device 601 is further examined in detail below.

Figure 10:
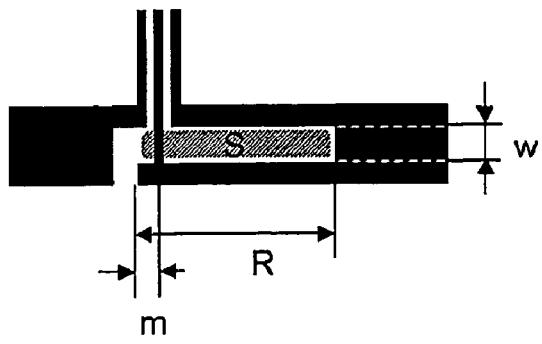
FIG. 10 is an explanatory diagram showing parameters of the shape of the interface device.

FIG. 10 is an explanatory diagram showing the parameters of the shape in the interface device 601. They are described with reference to the diagram.

It is assumed that the length of the internal conductor portion 602 (hereinafter suitably referred to as "proximity path") is R, the distance between the internal conductor portion 602 and the external conductor portion 603 is w, and the length of the internal conductor portion 602 that is further extended over the connection point with the path conductor portion 604 is m.

Figure 11:
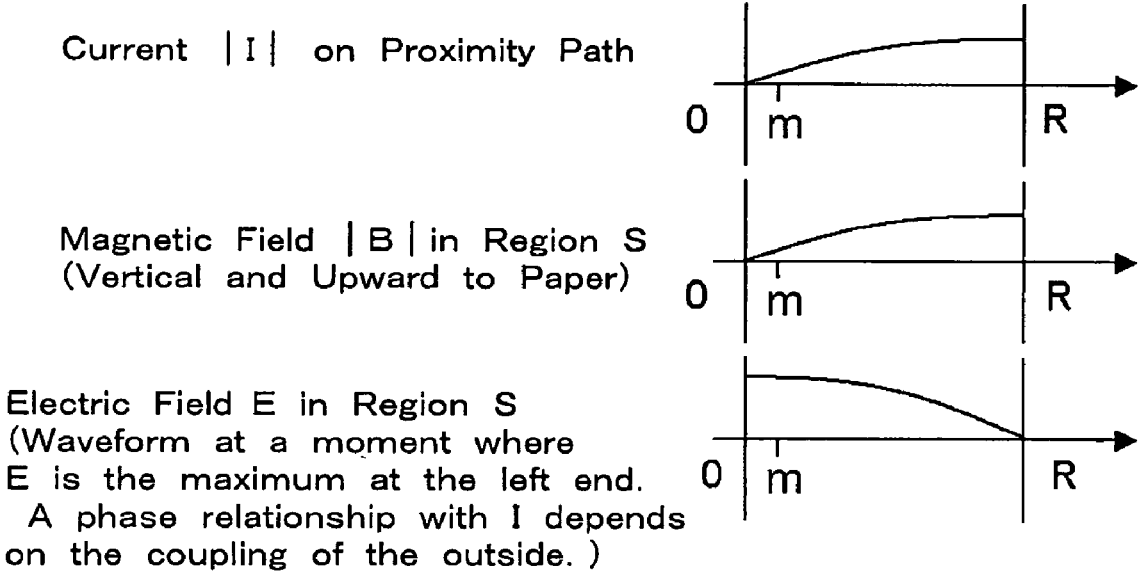
FIG. 11 is an explanatory diagram showing the condition of an electromagnetic field generated in a region in the vicinity of the internal conductor portion.

FIG. 11 is an explanatory diagram showing the condition of the electromagnetic field generated in the region S in the vicinity of the internal conductor portion 602 under such conditions.

R, m, w, and t are controlled so as to allow the impedance of the coaxial cable connected to the interface device 601 and the impedance when the inside of the interface device 601 is viewed from the portion to which the coaxial cable is connected to be closer to each other. Here, there is a place where the reactance components of the impedance are zero intersected when $R \approx \lambda/4$. Then, the length of R is set at a place where the reactance components are zero intersected.

Next, m, t, and w are simultaneously controlled so as to allow the actual portion of the impedance to be an impedance of the coaxial cable.

Figure 12:
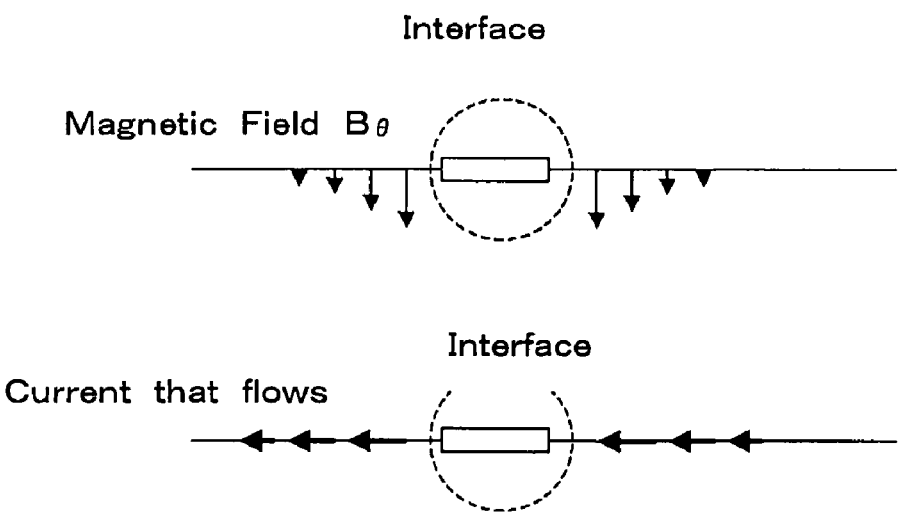
FIG. 12 is an explanatory diagram showing the condition of the electromagnetic field in $\phi_1$ mode.

The electromagnetic field of such $\phi_1$ mode is generated. However, FIG. 12 is an explanatory diagram showing the condition of the electromagnetic field in the $\phi_1$ mode. It is described with reference to the diagram below.

The rectangles shown in the upper and lower rows of the diagram are equivalent to the internal conductor portion 602. In addition, the external conductor portion 603 is in the circular shape shown in the dotted lines.

The upper row of the diagram shows the condition of the distribution relative to the electromagnetic field $B_\theta$ inside the signal carrying apparatus 101 in the direction of $\theta=0, 180°$. The other direction is a shape that the distribution in the diagram is multiplied by $\cos\theta$ times. In addition, although the component $B_r$ in the radius vector is also existent in the electromagnetic field in the vicinity of the center, it does not play a major role in the present invention.

The condition of the current flowing in the first conductor portion 111 inside the signal carrying apparatus 101 is shown. Thus, it is rather convenient because the electromagnetic wave can be discharged by merely inducing the current in one direction.

Namely, the electromagnetic field generated by the interface device 601 of the embodiment is largely superposed on the electromagnetic field in an asymmetric $\phi_1$ mode, and the electromagnetic field is discharged by merely inducing the magnetic field or the current in one direction in the vicinity of the signal carrying apparatus 101. Therefore, it is well coupled to the electromagnetic field of the signal carrying apparatus 101 generated by the interface device 601 of the embodiment.

The interface devices in the other shapes are further proposed below. FIG. 13 and FIG. 14 are explanatory diagrams each showing a schematic configuration of the circular interface device. They are described below with reference to the diagram below.

The upper row of the diagram is a bottom view of the interface device 601, and the middle row and the lower row are cross-sections. FIG. 14 is a perspective view of the interface device 601.

As shown in the diagram, the external conductor portion 603 of the circular interface device 601 is of a shape where a cylindrical side is attached to a disc, and a bordering is arranged on the reverse side of the disc. The internal conductor portion 602 is connected to the bordering.

In addition, the internal conductor portion 602 penetrates the center of the circle and is connected to the path conductor portion 604 at a place equivalent to the center of the circle.

The path conductor portion 604 penetrates the aperture provided in the vicinity of the center of the external conductor 603.

Then, the region covered with the external conductor is filled with dielectric and includes the insulator portion 605.

In this structure, it is considered that a stable coupling of less position dependency is possible even if the interface device 601 is existent in the mesh anywhere, because it is likely to be coupled with a symmetrical standing wave relative to the central axis of the interface device 601 and can be coupled with both of the $\phi_1$ mode and the axial symmetrical mode (the mode in which electromagnetic wave radially travels at an equal density of energy in all directions from the interface device 601).

In addition, in the embodiment, it may be also constituted such that the internal conductor portion 602 is of a cross-shape, the center of the cross-shape is connected to the path conductor 604, and four ends of the cross-shape are connected to the external conductor portion 603.

FIG. 15 is an explanatory diagram showing the other embodiments. They are described below with reference to the diagram.

In an example shown in the diagram, the internal conductor portion 602 and the path conductor portion 604 are integrated, one loop conductor is connected at the connection point 606 of the circular external conductor portion 603. A current path may be also secured by looping inside covered with the external conductor portion 603 functioning as a shield like this.

In addition to the afore-mentioned, a form that the internal conductor 602 is not connected to the external conductor portion 603 can be also considered. FIG. 16 is an explanatory diagram showing a relationship of the parameters and the conditions of the current and magnetic field in such a case. It is described with reference to the diagram below.

In the form that the internal conductor portion 602 is not directly connected to the external conductor portion 603, as shown in the upper row of the diagram, it is desirable that the length R of the internal conductor portion 602 is almost half of the wavelength $\lambda$. Impedance alignment is arranged by controlling the shortest distance m out of the width t of internal conductor portion 602, the distance w between the internal conductor portion 602 and the external conductor portion 603, and the distance between the contact point between the internal conductor portion 602 and the path conductor portion 604 and the end point of the internal conductor portion 602.

The three graphs in the lower row of the diagram show the current distribution, magnetic field distribution, and electric field distribution. The shape in the graph in FIG. 11 that is further extended is that of the graph in the diagram.

In the case of the example shown in the diagram, the length of the internal conductor portion 602 is set at half of the electromagnetic wavelength $\lambda$. As shown in the diagram, if the impedance z at the distance x towards near the center of the interface device 601 from the right tip of the internal conductor portion 602 is viewed, although $Z=\infty$ because the circuit is opened at x=0, it is Z=0 at x=$\lambda$/4.

Therefore, it means the same as a case that the internal conductor portion 602 and the external conductor portion 603 are short-circuited at a point of x=$\lambda$/4. Namely, it can be considered that a loop current path is formed by allowing the internal conductor portion 602 and the external conductor portion 603 to form a kind of capacitor at the wavelength $\lambda$.

Figure 17:
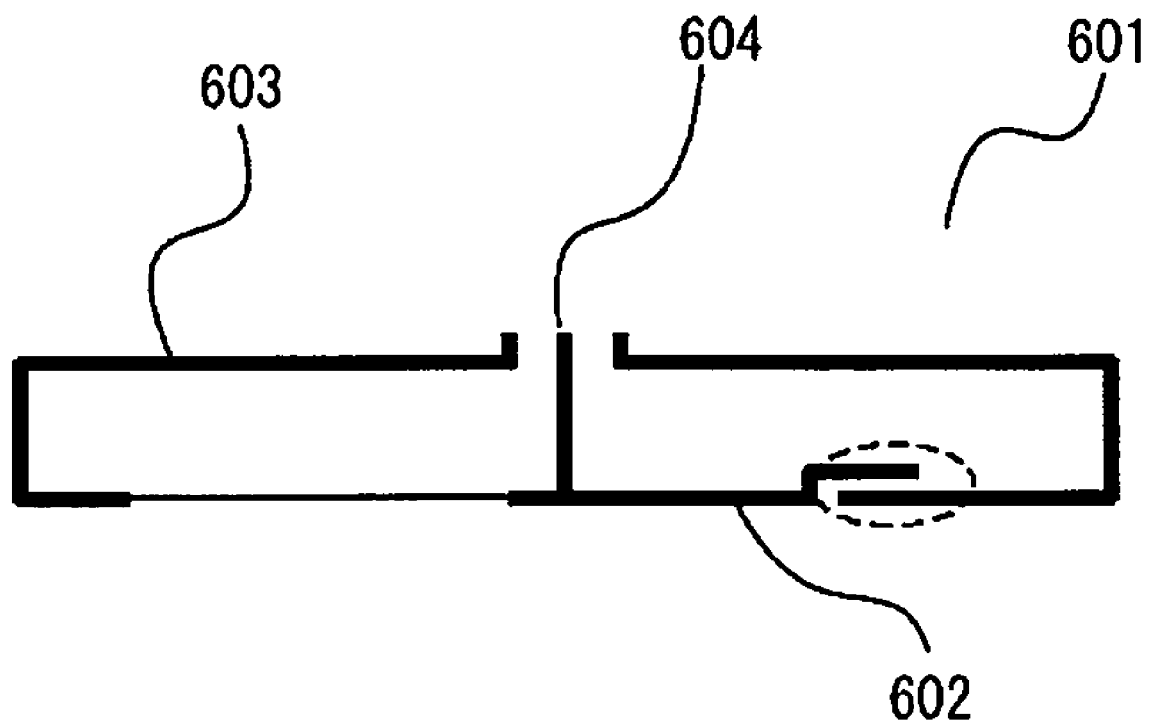
FIG. 17 is an explanatory diagram showing a method for performing impedance alignment.

FIG. 17 is an explanatory diagram showing the other method for arranging the impedance alignment. It is described with reference to the diagram.

As shown in the diagram, the internal conductor portion 602 is decoupled halfway, and it is determined to be capacitively coupled.

Thus, decoupling the internal conductor portion 602 halfway brings about the same effect as directly connecting a capacitance (typically a capacitor) to the internal conductor portion 602 at an entrance of the interface device 601.

In these cases, although the current path is decoupled, the vicinity of a decoupled point results in functioning as a so-called capacitor, an experiment confirms that it is possible to have an excellent coupling depending upon frequency bands to be used for communications. Namely, even in such a case, it can be considered that a current loop is formed relative to a non-direct current component.

In case of the embodiment shown in FIG. 17, there is an advantage that impedance alignment is easily arranged by performing the decoupling even if an external shape of the interface device 601 is small.

In addition, in the case of the embodiments shown in FIG. 16 and FIG. 17, the strength of radiation or reception of the electromagnetic wave is determined by the current flowing in the loop structure (including the decoupled one) and a path length, and a relative positional relationship between the position of decoupling and the signal carrying apparatus 101 does not directly determine the strength.

Thus, in the afore-mentioned embodiment, because the electromagnetic wave is dimensionally contained to perform communications, an energy required to transmit information to a certain distance is smaller than that of a wireless communication.

In addition, it is also possible to supply an electric power because a scope in which the energy is diffused is narrow.

Furthermore, it is considered that a multipath problem can be avoided and acceleration is possible as compared to the wireless communication.

Moreover, an electrical wiring is not required, and signals can be received between the interface device 601 and the signal carrying apparatus 101.

(Experiment Results)

A dielectric of dielectric constant 10 is filled in the region covered with the external conduction portion 603 of the interface device 601, and it is determined that the frequency band is 2.4 GHz, R=10 mm, and w=1.6 mm. In addition, for the connection position m of the path conduction portion 604, it shows an excellent result even in the case of m=5 mm. However, the below-mentioned shows the experiment result in the case of m=0 mm. In addition, the mesh cycle d=15 mm.

Figure 18:
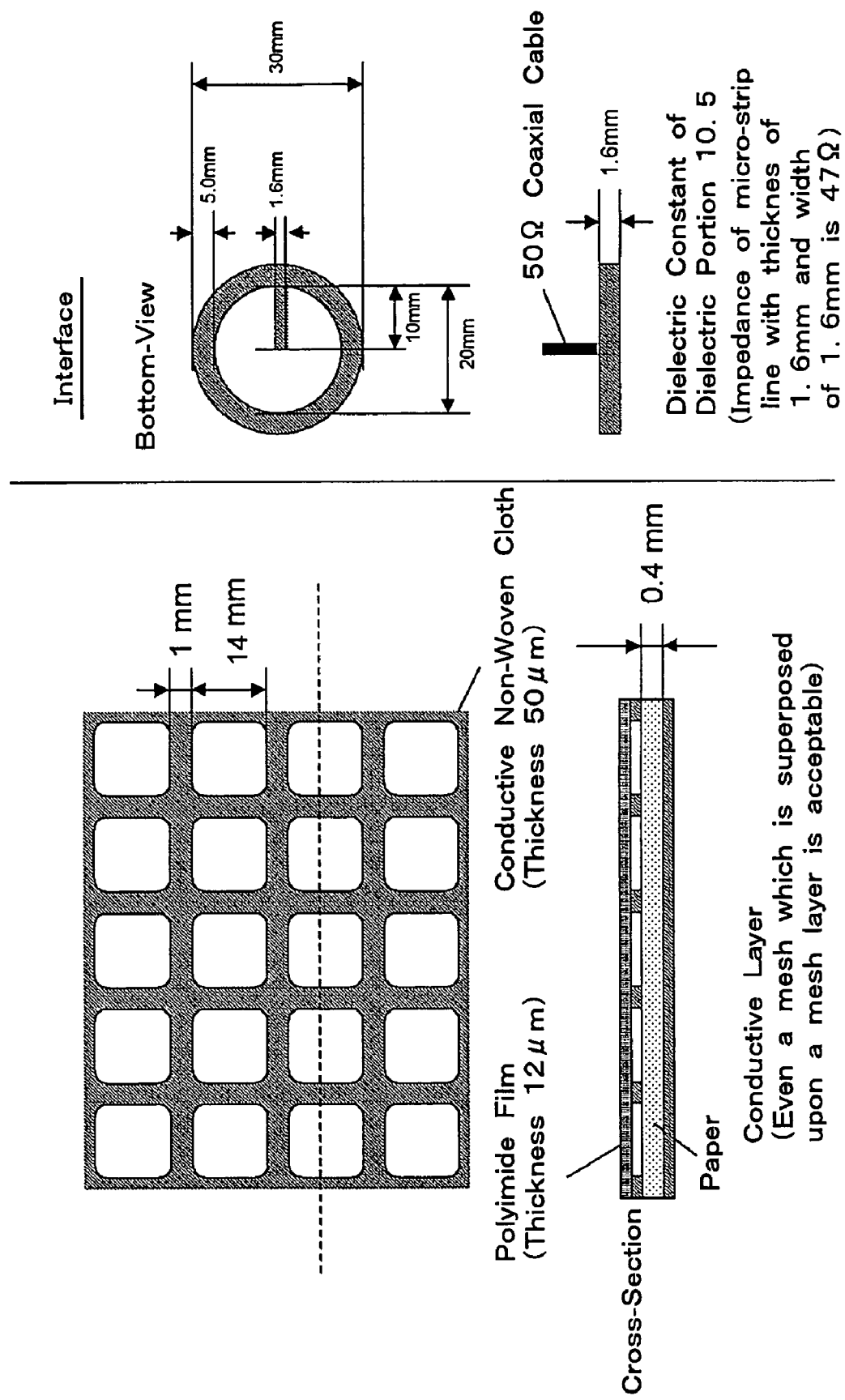
FIG. 18 is explanatory diagram showing experimental parameters of the signal carrying apparatus and the interface device.

FIG. 18 is an explanatory diagram showing the experimental parameters of the signal carrying apparatus 101 and the interface device 601.

Based on the data in the diagram, two interface devices 601 are disposed at the central distance 10 [cm], 2.4 [GHz] signal of amplitude 1[V] is transmitted from one side to the other. The receiving voltage (S12) when the height (position in the z axial direction) of the other interface device 601 is varied is observed. In addition, a 50 [$\Omega$] cable is each connected to the interfaces on both sides, and a network analyzer is used to measure the receiving voltage (S12).

In addition, in the data in the diagram, "line width 1 mm and aperture portion side 14 mm of the mesh" are described. These are equivalent to the values when the repeated unit of the mesh is 15 mm.

Figure 19:
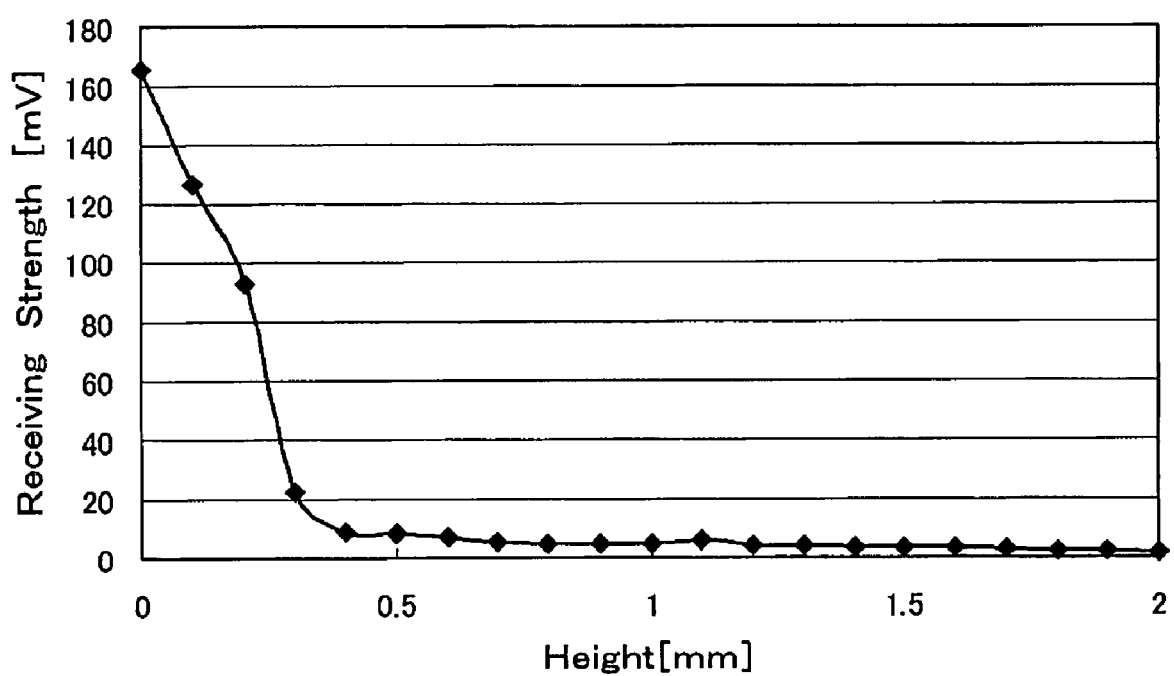
FIG. 19 is a graph showing a receiving power in case the interface device is allowed to gradually go away from the interface transmitter.

FIG. 19 is a graph showing the results. The receiving strength is quickly attenuated until it is deviated by about 0.5 mm.

In the next experiment, the distance between the two interface devices 601 is determined to be 6 [cm], three ways of the directions to the mesh of the interface device 601 on the reception side are considered. Each receiving voltage S12 when signals of 1 V amplitude are inputted by each frequency in 1 GHz to 5 GHz is plotted in the graph. A 50 $\Omega$ cable is each connected to two interfaces to measure the receiving voltage (S12) using the network analyzer.

FIG. 20 is a graph showing the results. The left end in the lateral axis of the graph is equivalent to 1 GHz and the right end to 5 GHz. As shown in the diagram, the signals are observed in the broad bands, and the availability of the present invention is confirmed. In addition, individual impedances are shown in the lowest row of the diagram. It is understood that impedance in 2.4 GHz band is varied with the directions of installation, because a coupling between the interface device 601 and the signal carrying apparatus 101 is strong.

Figure 21:
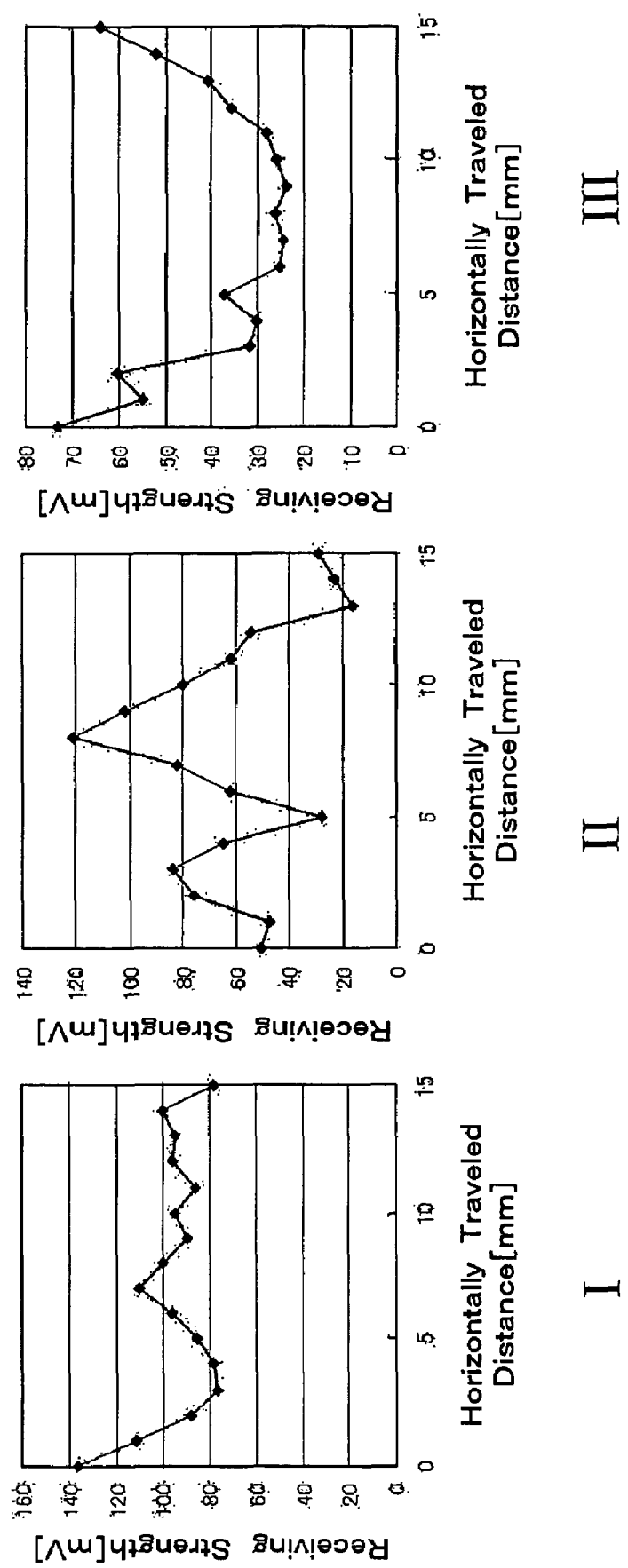
FIG. 21 is a graph showing the other receiving power in case the position of one interface device of the two interfaces is moved.

FIG. 21 is a graph in case the position of one interface device 601 is moved in the afore-mentioned case. As shown in the diagram, sufficiently strong signals are observed at any positions.

Embodiment 2

The variously modified examples of the afore-mentioned embodiment are described below.

Figure 22:
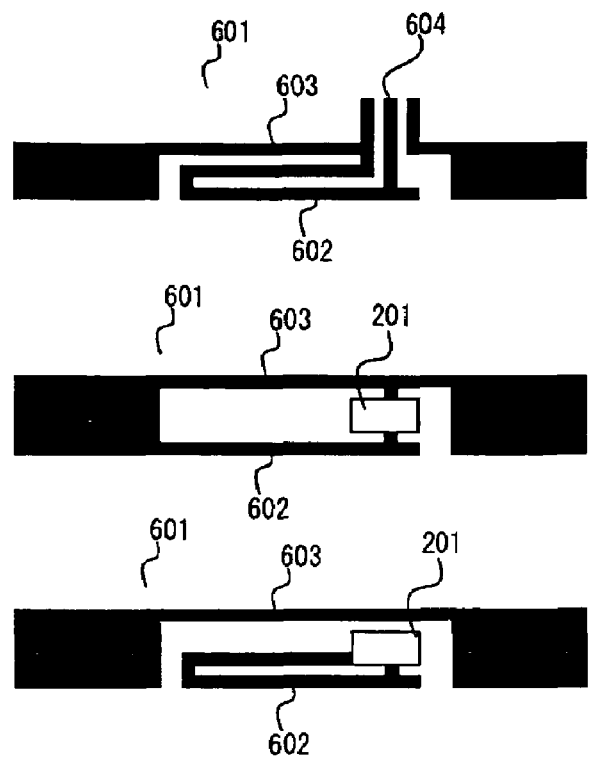
FIG. 22 is an explanatory diagram showing a cross-section of the other embodiment of the interface device.

FIG. 22 is an explanatory diagram showing cross-sections of the other embodiments of the interface device. They are described with reference to the diagram below.

The interface device 601 described in the lower row of the diagram is a form equivalent to what a combination of the communication device 201 and the loop antenna 202 described in FIG. 2 are covered with the external conductor portion 603. It can be considered that the opened side (opened portions) of the loop antenna 202 is equivalent to the internal conductor portion 602, and the external conductor portion 603 side of the loop antenna 202 is equivalent to the path conductor portion 604.

The interface device 601 described in the middle row of the diagram adopts the communication device 201 in place of the path conductor portion 604, and the external conductor portion 603 and the internal conductor portion 602 are directly connected with the communication device 201.

The interface device 601 described in the upper row of the diagram is the form of a point that the internal conductor portion 602 and the external conductor portion 603 are connected is in the vicinity of the aperture, and is similar to the embodiment shown in FIG. 15.

For the interface device 601 of the present invention, the electromagnetic field is densely coupled by allowing the internal conductor portion 602 to include a part of the loop and allowing the loop to be vertical to the surface of the signal carrying apparatus 101 if the interface device 601 contacts the signal carrying apparatus 101. In this case, the external conductor portion 603 covering these portions is prepared to prevent the leak of the electromagnetic field.

Figure 23:
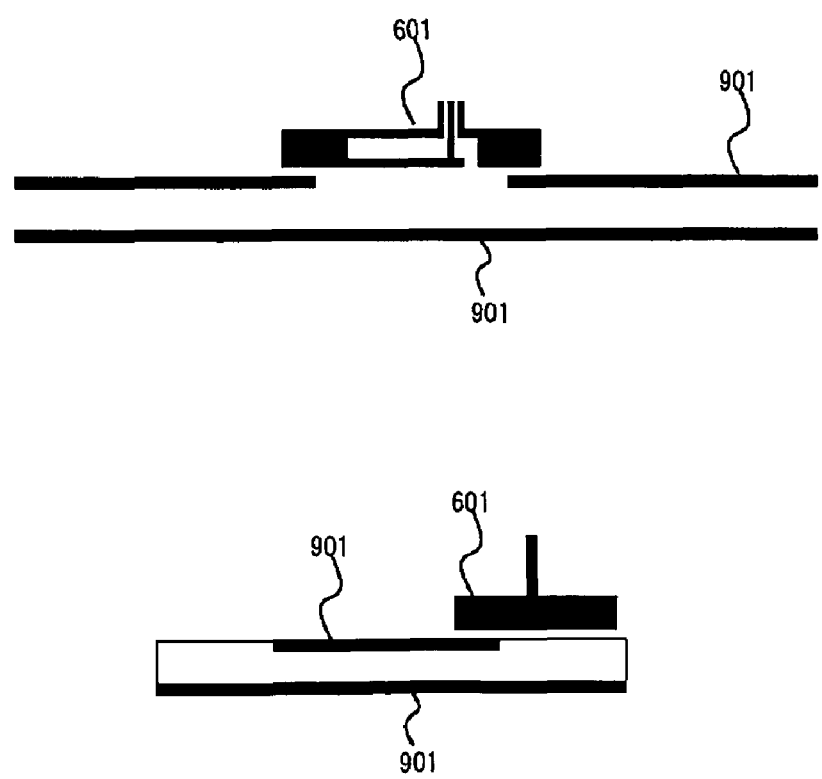
FIG. 23 is a cross-section showing a relationship between the interface device and a signal carrying apparatus of the other embodiment connectable to the former.

FIG. 23 is a cross-section showing a relationship between the interface device and a signal carrying apparatus of the other embodiment which is connectable thereto. It is described with reference to the diagram.

The interface device 601 described in the upper row of the diagram is disposed in the vicinity of an aperture of the conductive plate 901 having the aperture out of the two oppositely disposed conductive plates (may be a sheet-like conductor. Hereinafter is the same) 901. As in the afore-mentioned embodiment, because the electromagnetic wave is contained between the two conductive plates, signal transmission is possible and the interface device 601 simultaneously performs communications through the electromagnetic field that leaks from the aperture.

The interface device 601 described in the lower row of the diagram is the same as in the afore-mentioned. However, in the embodiment, the lower conductive plate 901 and the conductor 901 of narrower information width than the former are disposed, any of them is extended to intersect with the diagram, and they are of a strip shape as a whole. Further, they contain the electromagnetic wave in the region sandwiched between the two conductive plates 901. However, because the widths are different, as shown in the diagram, the electromagnetic field leaks at a place where the lower conductive plate 901 is exposed. Then, the interface device 601 performs the communications using the phenomenon.

Figure 24:
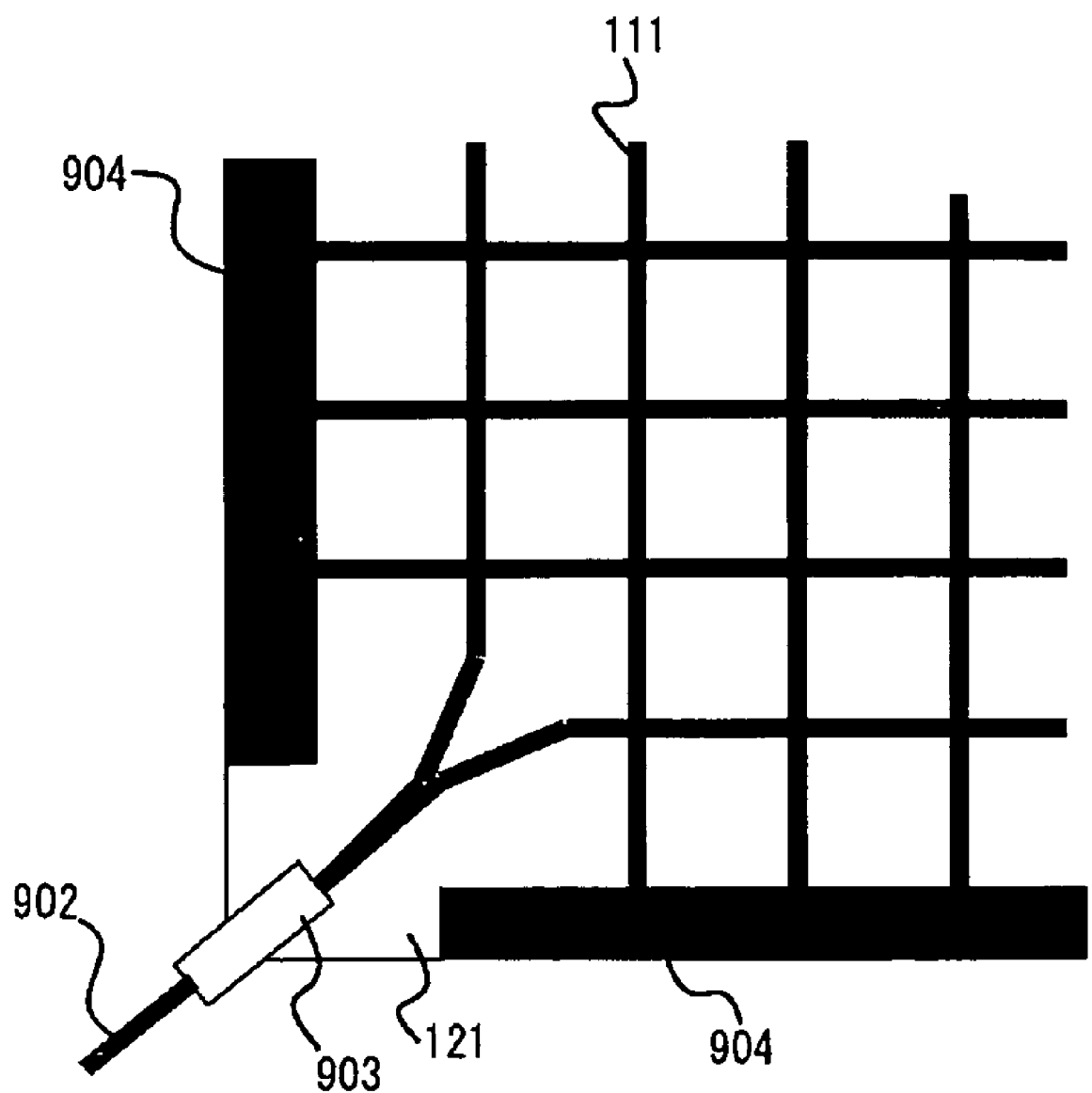
FIG. 24 is an explanatory diagram in case a wired connection is conducted onto the signal carrying apparatus.

FIG. 24 is an explanatory diagram in case it is connected to the signal carrying apparatus in wired connection. It is described with reference to the diagram below.

As shown in the diagram, the width of the wire is controlled so as to align the impedance just before the junction portion 903 where the meshed first conductor portion 111 of the signal carrying apparatus 101 is connected to the core of the coaxial cable 902. In addition, the external conductor of the coaxial cable 902 is connected to the second conductor portion 121.

In addition, in the example shown in the diagram, a striped conductor portion 904 is disposed at the edge of the first conductor portion 111, the electromagnetic wave absorber such as collective resistor is disposed between the striped conductor portion 904 and the second conductor portion 121 to prevent the leak of the electromagnetic wave.

FIG. 25 is explanatory diagram showing the embodiment where the first conductor portion of the signal carrying apparatus is of stripe shape in place of mesh.

As shown in the diagram, the first conductor portion 111 of the signal carrying apparatus 101 is disposed on the front side of the diagram of the second conductor portion 121, and the first conductor portion 111 is of striped shape that are converged at the root in place of the mesh. If the distance of these stripes is assumed as d, as in the afore-mentioned embodiment, the same leak region as in the afore-mentioned embodiment can be formed because an extent of leak of the electromagnetic wave is that of about d.

INDUSTRIAL APPLICABILITY

As stated above, the present invention can provide the signal carrying apparatus for transmitting a signal by variation of electromagnetic field in the interval region sandwiched between the meshed conductor portion and the sheet-like conductor portion and the leak region outside the meshed conductor side.

The invention claimed is:

1. A signal carrying apparatus (101) for carrying a signal by variation of an electromagnetic field, comprising:
a meshed first conductor portion (111) which serves as a conductor in the frequency band of the electromagnetic field, and a second conductor portion (121) of which external shape is sheet-like and which serves as a conductor in the frequency band of the electromagnetic field and arranged by being spaced out by a shorter distance than a wavelength in the frequency band of the electromagnetic field and substantially in parallel with the first conductor portion (111); wherein
the electromagnetic field is carried in the frequency band in an interval region (131) between the external shape of the first conductor portion (111) and the external shape of the second conductor portion (121), and in a planar leak region (141) located oppositely to the interval region (131) across the external shape of the first conductor portion (111); and wherein
a traveling wave component which is affected by the meshed shape out of the electromagnetic field in the leak region (141) has a strength attenuating exponentially with the distance from the external shape of the first conductor portion (111).

2. The signal carrying apparatus (101) according to claim 1, wherein a repeated unit length of the meshed shape is d that is shorter than a wavelength in the frequency band of the electromagnetic field.

3. The signal carrying apparatus (101) according to claim 1, wherein a mean width of sizes of meshes in the meshed shapes is d that is shorter than a wavelength in the frequency band of the electromagnetic field, and the thickness of the leak region (141) is d at the biggest.

4. The signal carrying apparatus (101) according to claim 1, wherein the meshed shape is a mesh where the same shaped polygon is repeated, and the repeated unit length is d that is sufficiently shorter than a wavelength in the frequency band of the electromagnetic field, and the strength of the traveling wave component which is affected by the meshed shape out of the electromagnetic field in the leak region (141) attenuates at a coefficient $e^{-2\pi z/d}$ or less to the distance z from the external shape of the first conductor portion (111) to the leak region (141).

5. The signal carrying apparatus (101) according to claim 1, wherein the meshed shape is a mesh where a plurality of circular holes are provided in a flat plate, and the central distances of the circular holes are each a shorter d than the wavelength in the frequency band of the electromagnetic field, and the strength of a traveling wave component which is affected by the meshed shape out of the electromagnetic field in the leak region (141) attenuates at a coefficient $e^{-2\pi z/d}$ or less to the distance z from the external shape of the first conductor portion (111) to the leak region (141).

6. The signal carrying apparatus (101) according to claim 1 wherein the apparatus and an antenna placed in the leak region (141) transmit signals from one to the other with variation of the electromagnetic field in the interval region (131) and the leak region (141).

7. The signal carrying apparatus (101) according to claim 1 wherein the apparatus and a communication device connected to the first conductor portion (111) and the second conductor portion (121) transmit signals from one to the other with a varied voltage between the first conductor portion (111) and the second conductor portion (121) together with the electromagnetic field in the interval region (131) and the leak region (141).

8. The signal carrying apparatus (101) according to claim 1, wherein the second conductor portion (121) is of a meshed shape, and further transmits the electromagnetic field in the frequency band in the opposite region (151) of planar shape located oppositely to the interval region (131) across the external shape of the second conductor portion (121).

9. The signal carrying apparatus (101) according to claim 1, wherein the first conductor portion (111) is of a striped shape in place of a meshed shape.

10. The signal carrying apparatus (101) according to claim 1, wherein the second conductor portion (121) is affixed onto the wall of a building, an insulator in the frequency band of the electromagnetic field is sprayed so as to cover the second conductor portion (121), and the first conductor portion (111) is affixed onto the sprayed insulator.

11. The signal carrying apparatus (101) according to claim 1, wherein a thickness of the interval region is comparable with d.

12. A communication system comprising a sheet-like signal carrying apparatus (101) and one or more interface devices (601), wherein (a) said sheet-like signal carrying apparatus (101) for carrying a signal by variation of an electromagnetic field, comprising:

a meshed first conductor portion (111) which serves as a conductor in the frequency band of the electromagnetic field, and a second conductor portion (121) of which external shape is sheet-like and which serves as a conductor in the frequency band of the electromagnetic field and arranged by being spaced out by a sufficiently shorter distance than a wavelength in the frequency band of the electromagnetic field and substantially in parallel with the first conductor portion (111); wherein the electromagnetic field is carried in the frequency band in an interval region (131) between the external shape of the first conductor portion (111) and the external shape of the second conductor portion (121), and in the planar leak region (141) located oppositely to the interval region (131) across the external shape of the first conductor portion (111); and wherein a traveling wave component which is affected by the meshed shape out of the electromagnetic field in the leak region (141) has a strength attenuating exponentially with the distance from the external shape of the first conductor portion (111); and (b) each of said one or more interface devices is located in the leak region (141), performs communication through a change in the electromagnetic field in the leak region (141), comprising:

an internal conductor (602) which serves as a conductive material in a frequency band of the electromagnetic field, and is placed within the electromagnetic field as the interface device (601) contacts the electromagnetic field;

an external conductor (603) which serves as a conductive material in the frequency band of the electromagnetic field, covers the electromagnetic field and the internal conductor (602) as the interface device (601) contacts the electromagnetic field, is connected to at least one end of the internal conductor (602), and has an opening; and a path conductor (604) which serves as a conductive material in the frequency band of the electromagnetic field, is connected to a portion of the internal conductor (602) other than the one end, and runs to an outside of that region which is covered by the external conductor (603) via the opening of the external conductor (603), and wherein the interface device (601) performs communication through a change in the electromagnetic field corresponding to a change in a current which flows in a current path running through the external conductor (603), the internal conductor (602), and the path conductor (604).

13. An interface device (601) which contacts an electromagnetic field, and performs communication through a change in the electromagnetic field, comprising:

an internal conductor (602) which serves as a conductive material in a frequency band of the electromagnetic field and is placed within the electromagnetic field as the interface device (601) contacts the electromagnetic field;

an external conductor (603) which serves as a conductive material in the frequency band of the electromagnetic field, covers the electromagnetic field and the internal conductor (602) as the interface device (601) contacts the electromagnetic field, is connected to at least one end of the internal conductor (602), and has an opening; and a path conductor (604) which serves as a conductive material in the frequency band of the electromagnetic field, is connected to a portion of the internal conductor (602) other than the one end, and runs to an outside of that region which is covered by the external conductor (603) via the opening of the external conductor (603), and wherein the interface device (601) performs communication through a change in the electromagnetic field corresponding to a change in a current which flows in a current path running through the external conductor (603), the internal conductor (602), and the path conductor (604).

14. An interface device (601) which contacts an electromagnetic field, and performs communication through a change in the electromagnetic field, comprising:

an internal conductor (602) which serves as a conductive material in a frequency band of the electromagnetic field, and is placed within the electromagnetic field as the interface device (601) contacts the electromagnetic field;

an external conductor (603) which serves as a conductive material in the frequency band of the electromagnetic field, covers the electromagnetic field and the internal conductor (602) as the interface device (601) contacts the electromagnetic field, and is connected to at least one end of the internal conductor (602); and a communication device which is connected to a portion of the internal conductor (602) other than the one end, and connected to a portion other than that portion where the external conductor (603) is connected to the internal conductor (602), and changes a voltage between those connection points within the frequency band of the electromagnetic field to perform communication.

15. An interface device (601) which contacts an electromagnetic field, and performs communication through a change in the electromagnetic field, comprising:

an internal conductor (602) which serves as a conductive material in a frequency band of the electromagnetic field, and forms a part of a loop perpendicular to a surface where the interface device contacts the electromagnetic field, as the interface device contacts the electromagnetic field; and an external conductor (603) which covers the electromagnetic field and the internal conductor (602) as the interface device (601) contacts the electromagnetic field, and wherein the interface device (601) changes a current flowing through the internal conductor (602) to perform communication.

16. The interface device (601) according to claim 15, wherein a length of the internal conductor (602) is approximately half of an electromagnetic wavelength of the electromagnetic field, the internal conductor (602) has at least one end serving as an open end, and the internal conductor (602) and the external conductor (603) serve as a part of the loop upon presence of that point where an impedance in the electromagnetic wavelength of the electromagnetic field with the external conductor (603) becomes zero between the one end of the internal conductor (602) and an other end thereof.

* * * * *

UNITED STATES PATENT AND TRADEMARK OFFICE
CERTIFICATE OF CORRECTION

PATENT NO. : 7,626,561 B2  Page 1 of 1
APPLICATION NO. : 12/066422
DATED : December 1, 2009
INVENTOR(S) : Shinoda et al.

It is certified that error appears in the above-identified patent and that said Letters Patent is hereby corrected as shown below:

On title page item (73) please add the second Assignee to the Assignee section of the issued U.S. Letters Patent:

The University of Tokyo
3-1, Hongo 7-Chome, Bunkyo-Ku
Tokyo, Japan 113-0033

Signed and Sealed this

Thirty-first Day of August, 2010

David J. Kappos
*Director of the United States Patent and Trademark Office*